(12) United States Patent
Komatsu et al.

(10) Patent No.: US 6,599,356 B2
(45) Date of Patent: Jul. 29, 2003

(54) METHOD FOR MANUFACTURING PIGMENT DISPERSED LIQUID, AND PIGMENT DISPERSED LIQUID, AND INK FOR INK-JET PRINTER RECORDING USING SAID PIGMENT DISPERSED LIQUID

(75) Inventors: Hidehiko Komatsu, Nagano (JP); Kazuhiko Hara, Nagano (JP); Hitoshi Ota, Nagano (JP); Hiroko Hayashi, Nagano (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 09/895,005

(22) Filed: Jun. 28, 2001

(65) Prior Publication Data
US 2002/0088375 A1 Jul. 11, 2002

(30) Foreign Application Priority Data

Jun. 28, 2000 (JP) .................................... 2000-195011
Feb. 28, 2001 (JP) .................................... 2001-054602

(51) Int. Cl.$^7$ ............................................. C09D 11/00
(52) U.S. Cl. ................. 106/493; 406/31.6; 406/412; 406/413; 406/476; 406/494; 406/495; 406/496; 406/497; 406/498; 406/499; 210/767; 210/787; 347/100
(58) Field of Search ............................. 106/410, 412, 106/413, 476, 493, 494, 495, 496, 497, 498, 499, 31.6; 210/767, 787; 347/100

(56) References Cited

U.S. PATENT DOCUMENTS

| | | | | |
|---|---|---|---|---|
| 5,609,671 A | * | 3/1997 | Nagasawa | 106/31.65 |
| 5,895,522 A | * | 4/1999 | Belmont et al. | 106/31.6 |
| 5,922,118 A | * | 7/1999 | Johnson et al. | 106/31.6 |
| 5,928,419 A | * | 7/1999 | Uemura et al. | 106/31.6 |
| 5,968,243 A | * | 10/1999 | Belmont et al. | 106/31.6 |
| 5,976,233 A | * | 11/1999 | Osumi et al. | 106/31.75 |
| 6,432,192 B1 | * | 8/2002 | Cook et al. | 106/496 |

FOREIGN PATENT DOCUMENTS

| | | | |
|---|---|---|---|
| EP | 1 146 090 | * | 10/2001 |
| JP | 10110129 | | 4/1998 |
| JP | 10287836 | | 10/1998 |
| JP | 10-330665 | * | 12/1998 |
| JP | 11049974 | | 2/1999 |
| JP | 11166131 | | 6/1999 |
| JP | 2000-132341 | * | 5/2000 |

OTHER PUBLICATIONS

Patent Abstract of Japan Publication No. 10110129 dated Apr. 28, 1998.
Patent Abstract of Japan Publication No. 11049974 dated Feb. 23, 1999.
Patent Abstract of Japan Publication No. 10287836 dated Oct. 27, 1998.
Patent Abstract of Japan Publication No. 11166131 dated Jun. 22, 1999.

* cited by examiner

Primary Examiner—Anthony J. Green
(74) Attorney, Agent, or Firm—Ladas & Parry

(57) ABSTRACT

A method for manufacturing a pigment dispersed liquid, comprising at least:

Step A of introducing a hydrophilic dispersibility-imparting group directly and/or via another atomic group to the surface of pigment particles;

Step B of dispersing the pigment obtained in Step A in an aqueous medium; and

Step C of conducting refining treatment of the dispersed liquid obtained in Step B.

26 Claims, No Drawings

METHOD FOR MANUFACTURING PIGMENT DISPERSED LIQUID, AND PIGMENT DISPERSED LIQUID, AND INK FOR INK-JET PRINTER RECORDING USING SAID PIGMENT DISPERSED LIQUID

BACKGROUND OF THE INVENTION

1. Field of the Invention

The present invention relates to a method for manufacturing a pigment dispersed liquid, to the pigment dispersed liquid obtained by this method, and to pigment ink in which this pigment dispersed liquid is used. The pigment dispersed liquid of the present invention and the pigment ink in which this pigment dispersed liquid is used can be advantageous for ink-jet printer inks that are discharged from a recording head by subjecting the ink to discharge energy by utilizing mechanical energy (produced with a piezoelectric device or the like) or thermal energy (produced with a heating element). Also, the pigment dispersed liquid of the present invention and the pigment ink in which this pigment dispersed liquid is used can be employed in various applications, such as ink for fountain pens, ball-point pens, felt-tip pens and other writing implements, industrial coating liquids, and paints that are used for airbrushes, and so forth.

2. Description of the Related Art

Dyes have been mainly used as the colorant for ink-jet printer inks, but in recent years the use of pigments has been investigated because of its better durability. When a pigment is used as a colorant, the recording product has superior water resistance, light fastness, and other aspects of durability, as compared to when a dye is used.

Unlike dyes, pigments do not dissolve in water, so when they are used as a colorant for water-based inks, a resin or other such dispersant is adsorbed to the pigment surface and the pigment particles are dispersed in water for use. It is difficult, though, to keep a pigment in a stable dispersed state within an aqueous medium, and the adsorbed dispersant may come off the pigment surface, which can lead to a situation in which the colorant is dispersed in the form of particles and the pigment particles agglomerate together and precipitate. Moreover, when the particles are relatively large in diameter (300 nm or more), the state in which the particles of the colorant are dispersed may cause detrimental effects such as settling of the pigment due to the weight of the pigment particles themselves.

In some cases, other than the colorant and water, various solvents, surfactants, and so forth were also added to an ink-jet printer ink or a bubble-jet printer ink. It was difficult to maintain a stable dispersed state with a conventional method in which a resin or other such dispersant was used to disperse pigment particles in an aqueous medium. Also, when a resin-dispersed pigment ink was used in continuous printing, the resin would adhere and remain around the nozzles of the ink jet head or the like, and this built-up resin would deflect the ink trajectory, or the resin would dry and solidify within the nozzles as the water evaporated, and this would sometimes lead to poor discharge.

In view of this, various techniques have been proposed for obtaining self-dispersing pigments by imparting water dispersibility to the pigment itself. For instance, in Japanese Laid-Open Patent Applications H10-195360, H10-330665, and elsewhere, it has been proposed to used a self-dispersing carbon black pigment in which carboxyl groups, carbonyl groups, sulfone groups, hydroxyl groups, or other such hydrophilic groups are bonded, either directly or via polyvalent groups, to the surface of the carbon black; in Japanese Laid-Open Patent Applications H8-3498, H10-195331, H10-237349, and elsewhere it has been proposed that dispersibility can be improved by oxidizing the surface of the carbon black; and in Japanese Laid-Open Patent Applications H8-283598, H1-10110, H10-110111, and elsewhere, it has been proposed to use a surface-treated pigment in which sulfone groups have been introduced at the surface of an organic pigment.

Also, Japanese Laid-Open Patent Application H11-49974 discusses the preparation of an organic pigment block that is positively charged on the surface by using an organic pigment block in which sulfone groups have been introduced and treating it with monovalent metal ions; also a water-based ink composition with excellent storage stability, which contains water, a dispersant, and pigment microparticles prepared from this organic pigment block with a positively charged surface is discussed.

Various ink properties are required of ink used in an ink-jet printer, but it is especially important to ensure the storage stability of the ink itself and the discharge stability during ink-jet recording (preventing clogging, deflection, and so forth). Excellent quality is also required of the print on the recording paper (such as a printed image with high print density and little bleeding). Specifically, it is desirable for an ink-jet printer ink to simultaneously satisfy the above-mentioned ink properties, discharge characteristics, and high print quality. Because the self-dispersing surface-treated pigment has dispersion groups that work through chemical bonding on its surface, it has excellent storage stability, making it easy to ensure the various requirements of an ink-jet printer ink as discussed above are met.

Today, however, an ink-jet printer must be capable of printing very fine printed images at high speed, and extremely fine ink dots have to be discharged at a higher frequency than in the past. Therefore, the ink that is used is also subject to more stringent requirements in order to achieve stable printing characteristics. In particular, with a pigment ink, which unlike a dye consists of particles dispersed in the ink, achieving both stable discharge characteristics and good storage stability has become quite difficult even with a self-dispersing pigment ink whose basic characteristics are excellent.

It is therefore hoped that a pigment ink for ink-jet printers will be developed, which can be used for today's ink-jet printers with fine nozzles, to achieve high image quality, and which can secure storage stability and the required printing characteristics.

DISCLOSURE OF THE INVENTION

Concerning the manufacture of ink containing a self-dispersing surface-treated pigment as described above, the inventors conducted diligent research into the conditions for satisfying the above-mentioned storage stability (particularly, the storage stability under the condition when the ink is left aside at high temperatures), and discharge stability (prevention of clogging, ink deflection, and so forth), whereupon they discovered that it is important to optimize the refining treatment of a pigment or pigment dispersed liquid upon dispersing a surface-treated pigment in an aqueous solvent. Particularly, they discovered that it is very important to conduct, under optimal conditions, membrane process, such as precision filtration, ultrafiltration, dialysis filtration, reverse osmosis, or electrodialysis, of the pigment dispersed liquid, or to conduct centrifugal sedimentation filtration by repeating centrifugal sedimentation and dispersion of the pigment. The present invention is based on this finding.

Accordingly, this invention is a method for manufacturing a pigment dispersed liquid, comprising at least: Step A of introducing a hydrophilic dispersibility-imparting group directly and/or via another atomic group to the surface of pigment particles; Step B of dispersing the pigment obtained in Step A in an aqueous medium; and Step C of conducting refining treatment of the dispersed liquid obtained in Step B.

According to a preferred embodiment of this invention, the pigment in which a hydrophilic, dispersibility-imparting group has been introduced directly and/or via another atomic group in Step A is a carbon black pigment and/or an organic pigment.

According to a preferred embodiment of this invention, the pigment in which a hydrophilic, dispersibility-imparting group has been introduced directly and/or via another atomic group in Step A is one or more pigments selected from the group consisting of C.I. pigment yellow, C.I. pigment red, C.I. pigment violet, C.I. pigment blue, C.I. pigment orange, C.I. pigment green, and C.I. pigment brown.

According to a preferred embodiment of this invention, the pigment in which a hydrophilic, dispersibility-imparting group has been introduced directly and/or via another atomic group in Step A is one or more pigments selected from the group consisting of phthalocyanine pigment, quinacridone pigment, condensed azo pigment, isoindolinone pigment, quinophthalone pigment, anthraquinone pigment, benzimidazolone pigment, and perylene pigment.

According to a preferred embodiment of this invention, the hydrophilic, dispersibility-imparting group introduced to the pigment surface directly and/or via another atomic group in Step A is one or more types selected from the group consisting of functional groups expressed by the following formulas or salts thereof: —OM, —COOM, —CO—, —SO$_3$M—, —SO$_2$M, —SO$_2$NH$_2$, —RSO$_2$M, —PO$_3$HM, —PO$_3$M$_2$, —SO$_2$NHCOR, —NH$_3$, —NR$_3$ (where M is a hydrogen atom, alkali metal, ammonium, or organic ammonium, and R is a C$_1$ or C$_2$ alkyl group, a substitutable phenyl group, or a substitutable naphthyl group).

According to a preferred embodiment of this invention, the hydrophilic, dispersibility-imparting group introduced to the pigment surface directly and/or via another atomic group in Step A is a sulfur-containing dispersibility-imparting group.

According to a preferred embodiment of this invention, a high molecular substance is introduced to the pigment surface directly or via another atomic group in Step A.

According to a preferred embodiment of this invention, ultrafiltration and/or sedimentation filtration is conducted in Step C.

According to a preferred embodiment of this invention, the ultrafiltration is conducted by using an ultrafiltration film of which molecular cutoff is not less than 1,000 and not more than 1,000,000.

According to a preferred embodiment of this invention, the ultrafiltration is conducted by using an ultrafiltration film of which molecular cutoff is not less than 10,000 and not more than 500,000.

According to a preferred embodiment of this invention, the sedimentation filtration is conducted under centrifugal acceleration conditions of 5,000 rpm or more.

According to a preferred embodiment of this invention, Step B is the step of conducting dispersion treatment in the state of a liquid mixture composed of at least the dispersibility-imparting group introduced pigment, a wetting agent, and water.

According to a preferred embodiment of this invention, the wetting agent in Step B is one or more substances selected from the group consisting of acetylene glycols, acetylene alcohols, glycol ethers, and alkylene glycols.

According to a preferred embodiment of this invention, the acetylene glycol and acetylene alcohol are compounds expressed by Formula I or II, as indicated below.

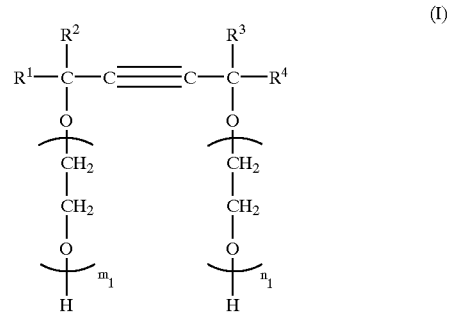

(where $R^1$, $R^2$, $R^3$, and $R^4$ are each independently an alkyl group, and $m_1+n_1$ is a number from 0 to 30)

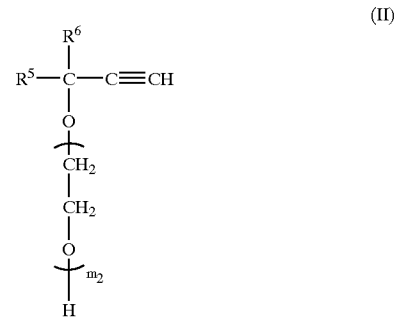

(where $R^5$ and $R^6$ are each independently an alkyl group, and $m_2$ is a number from 0 to 30).

Concerning a pigment dispersed liquid of this invention, the electric conductivity of a filtrated liquid is 10 mS/cm or less when ultrafiltration (molecular cutoff: 50,000) is conducted with a pigment concentration of 10 wt % or less.

Concerning the pigment dispersed liquid of this invention, absorbance at a maximum absorption wavelength is 1.0 or less when a pigment concentration is 10 wt %.

Moreover, according to a preferred embodiment of the pigment dispersed liquid of this invention, the pigment is manufactured by the manufacturing method described above.

An ink-jet recording ink of this invention contains at least the pigment dispersed liquid described above.

In an ink-jet recording method of this invention, energy is imparted to ink so that the ink is discharged from a recording head and adheres to a recording medium.

According to a preferred embodiment of this invention, the energy is mechanical energy.

According to a preferred embodiment of this invention, the energy is thermal energy.

A recording product of this invention is recorded by any of the methods described above.

In this specification, the term "self-dispersing pigment" refers to a pigment of which particles are able to disperse in a solvent all by themselves. This is not a pigment that is dispersed by having a resin or other dispersants adsorbed to the pigment particle surface, and rather indicates a self-dispersing surface-treated pigment that is capable of dispersing in water due to hydrophilic, dispersibility-imparting groups that are chemically bonded to the pigment particle surface (this will sometimes be referred to as a "surface-treated pigment" in this specification).

Using such a self-dispersing surface-treated pigment as an ink colorant allows the content of dispersant, such as the resin dispersants used in the past, to be reduced, which lowers the viscosity of the ink and makes clogging less apt to occur, and since there are fewer limitations on additives, a surfactant can be added to obtain a quick-drying ink that permeates more quickly into the recording medium. Also, the pigment (which is the colorant) content can be correspondingly increased because less dispersant is added, which means that at a given pigment concentration, a higher print density can be obtained than with a conventional resin-dispersed or surfactant-dispersed ink, which affords better image quality with higher color expression.

A "refluxed liquid" in ultrafiltration generally refers to a concentrated liquid which has been concentrated without permeating though a filtration film, and a "filtrated liquid" refers to a permeated liquid which has been permeated through a filtration film. In this specification, when ultrafiltration is conducted repeatedly in Step C, immediately before the refluxed liquid is removed from the ultrafiltration treatment in order to be used for ink preparation, such refluxed liquid is specifically referred to as a "final refluxed liquid."

The "wetting agent" referred to in this specification is added in the course of creating a dispersed liquid by dispersing the surface-treated pigment obtained in the surface treatment step, or a slurry, wet cake, or the like, of the surface-treated pigment, in an aqueous medium (particularly ion exchange water or distilled water), and has the effect of improving the miscibility (wettability) of the pigment particles with the dispersion medium. It also has the effect of raising the dispersion efficiency by increasing the contact resistance between the pigment and the dispersion medium or between the pigment particles in the dispersion medium. As a result, the shear conditions of the apparatus can be made less severe in the dispersion step (that is, the shear force to which the pigment dispersed liquid is subjected by the apparatus can be lowered), and it is possible to shorten the time it takes for the dispersion treatment.

The following pigments are examples of pigments that can be used for the method for manufacturing a pigment dispersed liquid, the pigment dispersed liquid itself, and ink using the pigment dispersed liquid according to this invention.

Examples of black inorganic pigments include furnace black, lamp black, acetylene black, channel black, and other types of carbon black (C.I. pigment black 7).

Examples of pigments that can be used mainly for yellow inks include C.I. Pigment Yellow 1 (Hansa Yellow G), 2, 3 (Hansa Yellow 10G), 4, 5 (Hansa Yellow 5G), 6, 7, 10, 11, 12 (Disazo Yellow AAA), 13, 14, 16, 17, 24 (Flavanthrone Yellow), 55 (Disazo Yellow AAPT), 61, 61:1, 65, 73, 74 (Fast Yellow 5GX), 75, 81, 83 (Disazo Yellow HR), 93 (Condensed Azo Yellow 3G), 94 (Condensed Azo Yellow 6G), 95 (Condensed Azo Yellow GR), 97 (Fast Yellow FGL), 98, 99 (Anthraquinone), 100, 108 (Anthrapyrimidine Yellow), 109 (Isoindolinone Yellow 2GLT), 110 (Isoindolinone Yellow 3RLT), 113, 117, 120 (Benzimidazolone Yellow H2G), 123 (Anthraquinone Yellow), 124, 128 (Condensed Azo Yellow 8G), 129, 133, 138 (Quinophthalone Yellow), 139 (Isoindolinone Yellow), 147, 151 (Benzimidazolone Yellow H4G), 153 (Nickel Nitroso Yellow), 154 (Benzimidazolone Yellow H3G), 155, 156 (Benzimidazolone Yellow HLR), 167, 168, 172, 173 (Isoindolinone Yellow 6GL), and 180 (Benzimidazolone Yellow).

Examples of pigments used for magenta inks include C.I. Pigment Red 1 (Para Red), 2, 3 (Toluidine Red), 4, 5 (1TR Red), 6, 7, 8, 9, 10, 11, 12, 14, 15, 16, 17, 18, 19, 21, 22, 23, 30, 31, 32, 37, 38 (Pyrazolone Red), 40, 41, 42, 88 (Thioindigo Bordeaux), 112 (Naphthol Red FGR), 114 (Brilliant Carmine BS), 122 (dimethylquinacridone), 123 (Perylene Vermilion), 144, 146, 149 (Perylene Scarlet), 150, 166, 168 (Anthanthrone Orange), 170 (Naphthol Red F3RK), 171 (Benzimidazolone Maroon HFM), 175 (Benzimidazolone Red HFT), 176 (Benzimidazolone Carmine HF3C), 177, 178 (Perylene Red), 179 (Perylene Maroon), 185 (Benzimidazolone Carmine HF4C), 187, 188, 189 (Perylene Red), 190 (Perylene Red), 194 (Perynone Red), 202 (Quinacridone Magenta), 209 (Dichloroquinacridone Red), 214 (Condensed Azo Red), 216, 219, 220 (Condensed Azo), 224 (Perylene Red), 242 (Condensed Azo Scarlet), and 245 (Naphthol Red), or C.I. Pigment Violet 19 (quinacridone), 23 (Dioxadine Violet), 31, 32, 33, 36, 38, 43, and 50.

Examples of pigments used for cyan inks include C.I. Pigment Blue 15, 15:1, 15:2, 15:3, 15:4, 15:6 (hereinafter all referred to as Phthalocyanine Blue), 16 (non-metallic Phthalocyanine Blue), 17:1, 18 (Alkali Blue Toner), 19, 21, 22, 25, 56, 60 (Threne Blue), 64 (Dichloroindanthrone Blue), 65 (Violanthrone), and 66 (Indigo).

Black organic pigments such as Aniline Black (C.I. Pigment Black 1) can be used as organic pigments for black ink.

Examples of organic pigments used for colored inks other than yellow, cyan, or magenta ink include C.I. Pigment Orange 1, 2, 5, 7, 13, 14, 15, 16 (Vulcan Orange), 24, 31 (Condensed Azo Orange 4R), 34, 36 (Benzimidazolone Orange HL), 38, 40 (Pyranthrone Orange), 42 (Isoindolinone Orange RLT), 43, 51, 60 (benzimidazolone insoluble monoazo pigment), 62 (benzimidazolone insoluble monoazo pigment), and 63; C.I. Pigment Green 7 (Phthalocyanine Green), 10 (Green Gold), 36 (Chlorobromophthalocyanine Green), 37, and 47 (Violanthrone Green); and C.I. Pigment Brown 1, 2, 3, 5, 23 (Condensed Azo Brown 5R), 25 (Benzimidazolone Brown HFR), 26 (Perylene Bordeaux), and 32 (Benzimidazolone Brown HFL).

One of the above pigments alone, or a combination of two or more may be used in the method for manufacturing the pigment dispersed liquid of this invention.

The self-dispersing pigment of the present invention is characterized by having been rendered dispersible in water without a dispersant by the introduction (chemical bonding) of functional groups or salts thereof as hydrophilic dispersibility-imparting groups onto the surface of the pigment particles, either directly or via another atomic group.

In the present invention, just one or a plurality of functional groups may be introduced in a single pigment particle. The type of functional group introduced and the number thereof may be suitably determined while taking into account the dispersion stability in the ink, color density, how fast the ink dries on the front of the ink jet head, and other such factors.

Examples of the functional group introduced as a hydrophilic, dispersibility-imparting group include one or more functional groups selected from the group consisting of functional groups expressed by the following formulas or salts thereof: —OM, —COOM, —CO—, —SO$_3$M—, —SO$_2$M, —SO$_2$NH$_2$, —RSO$_2$M, —PO$_3$HM, —PO$_3$M$_2$, —SO$_2$NHCOR, —NH$_3$, —NR$_3$ (In these formulas, M is a hydrogen atom, alkali metal, ammonium, or organic ammonium, and R is a $C_1$ to $C_{12}$ alkyl group, a substitutable phenyl group, or a substitutable naphthyl group.)

When a hydrophilic dispersibility-imparting group is introduced to the pigment via another atomic group, examples of another atomic group to which the dispersibility-imparting group is bonded may include $C_1$ to $C_{12}$ alkylene groups, substitutable phenylene groups, or substitutable naphthylene groups.

Various known surface treatment means can be employed as the surface treatment means for introducing the hydrophilic dispersibility-imparting groups (the above-mentioned functional groups or salts thereof) onto the surface of the pigment particles directly or via another atomic group.

For instance, ozone or a sodium hypochlorite solution can be made to act upon a commercially available oxidized carbon black to further oxidize the carbon black and further render the surface thereof hydrophilic (as in Japanese Laid-Open Patent Applications H7-258578, H8-3498, H10-120958, H10-195331, and H10-237349); carbon black can be treated with 3-amino-N-alkyl substituted pyridium bromide (as in Japanese Laid-Open Patent Applications H10-195360 and H10-330665); an organic pigment can be dispersed in a solvent in which the organic pigment is either insoluble or dissolves poorly, and sulfone groups can be introduced onto the surface of the pigment particles using a sulfonator (as in Japanese Laid-Open Patent Applications H8-283596, H10-110110, and H10-110111); an organic pigment can be dispersed in a basic solvent that forms a complex with sulfur trioxide, and sulfur trioxide can then be added to treat the surface of the organic pigment and introduce sulfone groups or sulfonamide groups (as in Japanese Laid-Open Patent Application H10-110114); or water-solubilizing functional groups and a polymer can be introduced onto the pigment surface by interposing phenylene groups bonded to carbon black through an azo coupling reaction (as in Japanese Laid-Open Patent Application 2000-53902). The above are merely examples, and the means for producing the surface-treated pigment used in the present invention is not limited to those listed above.

As long as it contains a sulfur atom and is a functional group that imparts dispersibility in water, there are no particular restrictions on the sulfur-containing dispersibility-imparting group used as the hydrophilic dispersibility-imparting group in the present invention, but specific examples include sulfinic acid ($SO_2^-$) groups and sulfonic acid ($SO_3^-$) groups.

The hydrophilic dispersibility-imparting groups introduced to the self-dispersing pigment as discussed above should be present on at least the particle surface, but may also be contained in the interior of the particles.

Also, the self-dispersing pigment used in the method of the present invention for manufacturing a pigment dispersed liquid can have a high molecular substance introduced (chemically bonded), either directly or via another atomic group, to the surface of the pigment particles.

A high molecular substance can be introduced to the pigment surface with relative ease by interposing other atomic groups. This reaction is accomplished by an acylation reaction or an ester group nucleophilic substitution reaction, for example.

Specific examples of this high molecular substance include polyethylene glycol, polypropylene glycol, polytetramethylene glycol, and homologs thereof (such as monoalkyl ethers or monoaryl ethers of polyethylene glycol, polypropylene glycol, or polytetramethylene glycol in which the carbon number of the alkyl groups is 1 to 10, amines of methoxypolyethylene glycol, polyvinyl alcohol and copolymers of polyvinyl acetate with polyvinyl alcohol, and polymethacrylic acid). It is preferable for these high molecular substances to have at least one amine group or hydroxy group at a terminal.

The effects of using a pigment dispersed liquid in which a high molecular substance has been introduced at the pigment surface as above, and of using ink containing this pigment dispersed liquid, are that precipitation characteristics are enhanced by the steric hindrance of the high molecular substance, and fixability to the recording medium during printing is improved, among other benefits.

The introduced amount of the dispersibility-imparting groups to the pigment particles contained in the ink used for this invention is preferably not less than $15 \times 10^{-6}$ equivalents per 1 g of pigment particles. If the introduced amount of the dispersibility-imparting groups is less than $15 \times 10^{-6}$ equivalents per 1 g of pigment particles, not only may the storage stability of the ink decrease, but also, high print density cannot be obtained.

The steps of manufacturing method of the pigment dispersed liquid of this invention are hereinafter described.

The method for manufacturing the pigment dispersed liquid of this invention mainly comprises the following three steps:

Step A of introducing a hydrophilic dispersibility-imparting group directly and/or via another atomic group to the surface of pigment particles;

Step B of dispersing the pigment obtained in Step A in an aqueous medium; and

Step C of conducting refining treatment of the dispersed liquid obtained in Step B.

In Step A, surface treatment (introduction of dispersibility-imparting groups) of the pigment is conducted by mixing the pigment with a surface-treating agent in an aqueous or nonaqueous solvent or by heating the mixture. The pigment used in the surface treatment step is preferably first pulverized into fine particles before the hydrophilic dispersibility-imparting groups are introduced. The pulverization of the pigment can be accomplished by wet or dry pulverization using zirconia beads, glass beads, an inorganic salt, or another such pulverization medium. The pulverization apparatus can be an attriter, a ball mill, a vibratory mill, or the like. After this pulverization, it is necessary to remove any contaminants generated from the pulverization medium or the pulverization apparatus, by washing the pigment or by other means. In particular, with a pulverization method that combines dry pulverization with an inorganic salt (salt milling), the contaminant generated from the pulverization medium is a water-soluble inorganic salt, and can therefore be easily removed by washing with water.

In Step B, the surface-treated pigment obtained in Step A, or a slurry, wet cake, or the like, of the surface-treated pigment, is added to an aqueous medium (particularly ion exchange water or distilled water) along with a neutralizer and, if needed, a wetting agent or the like to obtain a concentration of about 5–40 wt %. A suitable shear force is then imparted with an agitator or a dispersing apparatus so as to disperse the pigment particles in the aqueous medium and obtain a self-dispersing pigment dispersed liquid.

In Step C, reaction by-products, metal ions, or the like in the liquid components of the pigment dispersed liquid obtained in Step B are removed by ultrafiltration, sedimentation filtration, filtration washing, or other means.

It is also possible to continuously conduct the above-mentioned Steps A, B, and C. Particularly when the surface treatment of the pigment is conducted in an aqueous solvent, the reaction solvent used in the surface treatment Step Can be the same aqueous system as the dispersion medium used in the dispersion step, which makes it easier to link continuous steps. In this case, after the surface treatment of the pigment, the obtained reaction products repeatedly undergo treatment such as being washed with water, ultrafiltration, reverse osmosis, centrifugation, and/or filtration, to remove any residual unreacted components, reaction by-products, residual treatment agents, metal ions, or the like, thereby obtaining a surface-treated pigment dispersed liquid.

The method of the present invention for manufacturing a pigment dispersed liquid will now be described in further detail by giving an example of a method for manufacturing a pigment dispersed liquid having sulfur-containing dispersibility-imparting groups on its surface.
(Step A)

A pigment in the form of fine particles is put in an aprotic solvent (such as N-methyl-2-pyrrolidone or sulfolane) used in an amount of 3 to 200 times the weight of the pigment, and the pigment undergoes grading dispersion treatment while being treated with a sulfonation agent. This sulfonation agent can be a sulfonated pyridine salt, sulfamic acid, amidosulfuric acid, fluorosulfuric acid, chlorosulfuric acid, sulfur trioxide, fuming sulfur, sulfuric acid, or the like, which can be used singly or in combinations of two or more types. The treatment with the sulfonation agent can be carried out under heating (approximately 60° C. to 200° C.) and agitation, and the heating can be performed before or after the addition of the sulfonation agent.

After the sulfonation treatment, the aprotic solvent and any remaining sulfonation agent are removed from the pigment slurry thus obtained. This removal can be accomplished by repeated treatment such as washing with water, ultrafiltration, reverse osmosis, centrifugation, and/or filtration. Any contaminants admixed in the above-mentioned grading dispersion and sulfonation treatment are removed along with the aprotic solvent and sulfonation agent.
(Step B)

Next, the sulfonated pigment is added along with a neutralizer to an aqueous medium (particularly ion exchange water or distilled water) such that the concentration is about 5 to 40 wt %, and dispersion is performed without taking the step of drying the pigment, thereby obtaining an aqueous pigment dispersed liquid.

Examples of the apparatus that can be used for the dispersion treatment include a paint shaker, ball mill, sand mill, roll mill, speed line mill, homomixer, ultrasonic homogenizer, nanomizer, and microfluidizer.

The neutralizer is added for the purpose of dissociating the sulfur-containing dispersibility-imparting groups on the pigment surface. Specific examples include sodium hydroxide, lithium hydroxide, potassium hydroxide, ammonium hydroxide, triethanolamine, diethanolamine, monoethanolamine, 2-amino-2-methyl-1-propanol, N,N-dimethylethanolamine, and N,N-diethylethanolamine.

A wetting agent may be added in the dispersion treatment. Any wetting agent can be used, with no limitations thereon, as long as it has this effect of raising the dispersion efficiency. Examples of particularly suitable agents include acetylene glycols, acetylene alcohols, glycol ethers, and alkylene glycols. In addition, lower alcohols and nonionic surfactants can be used, and other alcohols, water-soluble organic solvents, anionic, cationic, and amphoteric surfactants, sugars, and so forth can also be used.

Addition of the wetting agent to an aqueous solvent of the surface-treated pigment at the time of dispersion increases the resistance caused by physical contact among the pigment particles and thereby enables enhancement of dispersion efficiency and reduction of dispersion time.

There are no particular restrictions on the amount of the wetting agent which is added, as long as it is at least large enough for the addition to improve the dispersion efficiency, but not so large that it will hinder the practical use of the pigment dispersed liquid or the dispersion state of the pigment. However, a preferable added amount is 0.05 to 50 wt % with respect to the pigment dispersed liquid in the dispersion step; more preferably in the range of 0.1 to 30 wt %. The effect of the wetting agent will not be fully realized if the added amount is less than 0.05 wt %, but exceeding 50 wt % may destabilize the dispersion of the pigment particles.
(Step C)

Subsequently, reaction by-products, metal ions, and so forth in the pigment dispersed liquid obtained above are removed by refining treatment such as ultrafiltration and centrifugal sedimentation filtration.

When an ultrafiltration film is used, the pigment particles do not permeate through the filtration film, but other low molecular substances such as organic acids and salts can permeate through the filtration film. Accordingly, for example, by placing the pigment dispersed liquid or ink on one side of the ultrafiltration film in a plate shape or in a hollow fiber shape, and by causing any impurities (such as reaction by-products and metal ions) to permeate through the film by means of pressing (it is also possible to use high pressure nitrogen gas or the like), decompression, or using centrifugal force to separate any reaction by-products, metal ions or the like, from the pigment particles in the dispersed liquid or ink. Ultrafiltration is filtration using pressure propulsion on a molecular scale, and an ultrafiltration film is used of which molecular cutoff is 1,000 or more and 1,000,000 or less; preferably 10,000 or more and 500,000 or less. If the molecular cutoff is more than 1,000,000, it is not desirable because the pigment particles easily clog the filtration film. On the other hand, if the molecular cutoff is less than 1,000, it is not desirable because it is sometimes impossible to separate any by-products of high molecular weight.

It is desirable to conduct ultrafiltration with 0.1–10 $kg/cm^2$ of pressure and at temperatures ranging from 15° C. to 50° C. However, this condition range may change due to the properties of the ultrafiltration film used.

It is desirable to conduct centrifugal sedimentation filtration under a centrifugal acceleration condition of 5,000 rpm or more; more preferably 10,000 rpm or more. If the centrifugal acceleration condition is lower than the above-mentioned condition, the pigment will not precipitate sufficiently and the refining precision will deteriorate.

The average particle diameter of the surface-treated pigment particles contained in the pigment dispersed liquid and/or ink of this invention is not particularly limited, as long as the introduced amount of the dispersibility-imparting groups of this invention is $15 \times 10^{-6}$ equivalents per 1 g of the pigment particles. However, a preferred average particle diameter of the surface-treated pigment particles is within the range of 10 nm to 300 nm. If the average particle diameter is less than 10 nm, light fastness may markedly decrease. On the other hand, if the average particle diameter is more than 300 nm, the pigment particles may precipitate and may not be discharged stably.

Concerning the ink of this invention, the content of the surface-treated pigment should preferably be 0.5 to 30 wt %, more preferably 1.0 to 12 wt %, and most preferably 2 to 10 wt %. If the content of the pigment particles is less than 0.5 wt %, the print density may not be sufficient. On the other hand, if the content of the pigment particles is more than 30 wt %, the amount of a moisture-retentive component to be added to the ink is limited, clogging of nozzles may easily occur, ink viscosity may increase, and the ink may not be stably discharged from the ink discharge nozzles.

Next, the wetting agent used in the method of the present invention for manufacturing a pigment dispersed liquid will be described. The wetting agent used in the present invention increases the pigment dispersion efficiency when added in the step of dispersing the surface-treated pigment in the aqueous medium (Step B).

The wetting agent has the effect of improving the miscibility (wettability) of the pigment particles with the dispersion medium when added at least during the dispersion of the surface-treated pigment in the aqueous medium (such as ion exchange water or distilled water), and also has the effect of raising the dispersion efficiency by increasing the contact resistance between the pigment particles in the dispersion medium. As a result, the shear conditions of the apparatus can be made less severe in the dispersion step (that is, the shear force to which the pigment dispersed liquid is subjected by the apparatus can be lowered), and it is possible to shorten the time it takes for the dispersion treatment and to reduce contaminant components, such as polyvalent metal ions, in the dispersion. Accordingly, it is possible to conduct refining treatment efficiently in the later refining treatment step (Step C) later.

Any wetting agent can be used, with no limitations thereon, as long as it has this effect of raising the dispersion efficiency, but examples of particularly suitable agents include acetylene glycols, acetylene alcohols, glycol ethers, and alkylene glycols. In addition, lower alcohols and non-ionic surfactants can be used, and other alcohols, water-soluble organic solvents, anionic, cationic, and amphoteric surfactants, sugars, and so forth can also be used.

The compounds expressed by Formula I or Formula II described later are specific examples of acetylene glycols and acetylene alcohols that can be used as wetting agents. Specific examples of product names include Surfynol TG, Surfynol 104, Surfynol 420, Surfynol 440, Surfynol 465, Surfynol 485, Surfynol 61, and Surfynol 82 (all made by Air Products), and Acetylenol EH, Acetylenol EL, and Acetylenol EO (all made by Kawaken Fine Chemicals).

The amount in which the acetylene glycol and acetylene alcohol are added in the dispersion step is preferably at least 1/50 and no more than twice the amount of pigment by weight. In particular, the dispersion effect will be inadequate if the added amount is less than 1/50. On the other hand, if a large amount is added (such as more than several times the amount of pigment), a decrease in surface tension will cause the ink to leak and spread out near the ink jet head, making it difficult to ensure stable discharge characteristics.

When the goal is to minimize the amount of wetting agent mixed into the ink, or when the goal is to suppress ink permeability, it is good to use an acetylene alcohol with a low molecular weight as the wetting agent. For instance, when the above-mentioned Surfynol 61 is used as the wetting agent, it is possible to keep the remaining amount to a minimum by causing volatilization by heating the dispersed liquid after the dispersion step.

Examples of glycol ethers that can be favorably used as the wetting agent include diethylene glycol mono ($C_4$ to $C_8$ alkyl) ether, triethylene glycol mono ($C_4$ to $C_8$ alkyl) ether, propylene glycol mono ($C_3$ to $C_6$ alkyl) ether, and dipropylene glycol mono ($C_3$ to $C_6$ alkyl) ether. Specific examples include diethylene glycol mono-n-butyl ether, triethylene glycol mono-n-butyl ether, propylene glycol mono-n-butyl ether, and dipropylene glycol mono-n-butyl ether. Specific examples of other glycol ethers that can be used include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-isopropyl ether, ethylene glycol mono-n-butyl ether, ethylene glycol mono-tert-butyl ether, diethylene glycol mono-tert-butyl ether, 1-methyl-1-methoxybutanol, propylene glycol monomethyl ether, propylene glycol monoethyl ether, propylene glycol mono-tert-butyl ether, propylene glycol mono-n-propyl ether, propylene glycol mono-isopropyl ether, dipropylene glycol monomethyl ether, dipropylene glycol monoethyl ether, dipropylene glycol mono-n-propyl ether, and dipropylene glycol mono-isopropyl ether.

Examples of alkylene glycols that can be used as the wetting agent include 1,2-($C_4$ to $C_{10}$ alkyl) diols, 1,3-($C_4$ to $C_{10}$ alkyl) diols, 1,5-($C_4$ to $C_{10}$ alkyl) diols, and 1,6-($C_4$ to $C_{10}$ alkyl) diols. Specific examples include 1,2-pentanediol, 1,2-hexanediol, 1,3-butanediol, 1,5-pentanediol, and 1,6-hexanediol.

Beside having an effect as wetting agents, the above-mentioned glycol ethers and/or alkylene glycols also have characteristics as solvent auxiliaries. Specifically, when one of the above-mentioned acetylene glycols that has low solubility in water when used alone is used, the solubility of that acetylene glycol can be raised and the added amount thereof increased by using it along with a glycol ether.

Furthermore, since the above-mentioned glycol ethers and/or alkylene glycols also have the considerable effect of killing and preventing fungus, the growth of microbes, fungi, and the like can be suppressed by adding these compounds to the dispersed liquid and the ink. Therefore, the growth of these microbes can be suppressed without having to add a fungicide, anti-fungal agent, or the like, by adding at least a specific amount (several percentage or more by weight) of these compounds as a wetting agent in the dispersion step.

Specific examples of other wetting agents include lower alcohols such as methanol, ethanol, 1-propanol, 2-propanol, 1-butanol, 2-butanol, isobutyl alcohol, tert-butyl alcohol, 1-pentanol, 2-pentanol, 3-pentanol, 2-methyl-1-butanol, iso-pentyl alcohol, tert-pentyl alcohol, 3-methyl-2-butanol, and neopentyl alcohol. Examples of nonionic surfactants include fluorine copolymers, silicone copolymers, acrylic copolymers, polyoxyethylene alkyl ethers, polyoxyethylene alkyl phenyl ethers, polyoxyethylene secondary alcohol ethers, polyoxyethylene sterol ethers, polyoxyethylene lauryl ethers, polyoxyethylene lanolin derivatives, oxyethylene derivatives of alkylphenol formalin condensates, polyoxyethylene polyoxypropylene block copolymers, polyoxyethylene polyoxypropylene alkyl ethers, fatty acid esters of polyoxyethylene compound type, polyethylene glycol fatty acid esters of condensed polyoxyethylene oxide type, fatty acid monoglycerides, polyglycerin fatty acid esters, sorbitan fatty acid esters, propylene glycol fatty acid esters, sucrose fatty acid esters, fatty acid alkanolamides, polyoxyethylene fatty acid amides, polyoxyethylenealkylamines, and alkylamine oxides.

Specific examples of yet other wetting agents include water-soluble organic solvents such as ethylene glycol, diethylene glycol, triethylene glycol, propylene glycol, tetraethylene glycol, polyethylene glycol, dipropylene glycol, polypropylene glycol, hexylene glycol, thiodiglycol, glycerin, and 1,2,6-hexanetriol; alcohols such as 1-hexanol, 2-methyl-1-pentanol, 4-methyl-2-pentanol, 2-ethyl-1-butanol, 1-heptanol, 2-heptanol, 3-heptanol, 1-octanol, 2-octanol, 2-ethyl-1-hexanol, 1-nonanol, 3,5,5-trimethyl-1-hexanol, and 1-decanol; anionic surfactants such as higher fatty acid salts, higher alkyldicarboxylates, higher alcohol sulfates, higher alkylsulfonates, alkylbenzenesulfonates, alkylnaphthalenesulfonates, naphthalenesulfonic acid salt (Na, K, Li, Ca) formalin polycondensates, condensates of higher fatty acids and amino acids, dialkylsulfosuccinates, alkylsulfosuccinates, naphthenates, alkyl ether carboxylates, acylates peptides, α-olefin sulfonates, N-acylmethyltaurine, alkyl ether sulfates, secondary higher alcohol ethoxysulfates, polyoxyethylene alkyl phenyl ether sodium sulfates, polyoxyethylene alkyl phenyl ether ammonium sulfates, monoglysulfates, alkyl ether phosphates, and alkylphosphates; cationic surfactants such as aliphatic amine salts, quaternary ammonium salts, sulfonium salts, and phosphonium salts; amphoteric surfactants such as carboxybetaine types, aminocarboxylates, and lecithin; and sugars such as glucose, mannose, fructose, ribose, xylose, arabinose, lactose, galactose, maltitol, sorbitol, gluconolactone, and maltose. The above list is not intended to be comprehensive, however.

In the method for manufacturing the pigment dispersed liquid of this invention, the above-described wetting agents can be used singly or in combinations of two or more kinds thereof. There are no particular restrictions on the amount in which the wetting agent is added, as long as it is at least large enough for the addition to improve the dispersion efficiency, but not so large that it will hinder the practical use of the pigment dispersed liquid or the dispersion state of the pigment. However, a preferable added amount is 0.05 to 50 wt % with respect to the pigment dispersed liquid in the dispersion step; more preferably in the range of 0.1 to 30 wt %. The effect of the wetting agent will not be fully realized if the added amount is less than 0.05 wt %, but exceeding 50 wt % may destabilize the dispersion of the pigment particles.

The ink of the present invention contains a penetrant for the purpose of increasing the permeability of the ink onto a recording paper.

The penetrant may be the same as or different from the above-mentioned wetting agent added during dispersion. If a wetting agent is selected that increases contact between the pigment particles during dispersion and that enhances permeability onto the recording paper, then this agent can serve both purposes. Also, when the ink is used for an ink-jet printer, it is particularly favorable for the ink to be of the very little foaming kind and to be resistant to drying inside the nozzles of the ink jet head. When a wetting agent that satisfies all of these characteristics is used, there is no need to add a wetting agent and a penetrant separately, which is advantageous in terms of the ink properties, and especially its viscosity.

Examples of compounds that satisfy the characteristics required of the wetting agent and penetrant include the above-mentioned acetylene glycols, acetylene alcohols, glycol ethers, and alkylene glycols.

Specific examples of acetylene glycols and acetylene alcohols include the compounds expressed by Formulas I and II described later.

Specific examples of product names include Surfynol TG, Surfynol 104, Surfynol 420, Surfynol 440, Surfynol 465, Surfynol 485, Surfynol 61, and Surfynol 82 (all made by Air Products), and Acetylenol EH, Acetylenol EL, and Acetylenol EO (all made by Kawaken Fine Chemicals).

Specific examples of glycol ethers include diethylene glycol mono-n-butyl ether, triethylene glycol mono-n-butyl ether, propylene glycol mono-n-butyl ether, and dipropylene glycol mono-n-butyl ether. The other glycol ethers previously listed can also be used.

These acetylene glycols, acetylene alcohols, glycol ethers, and alkylene glycols can be used singly or together as a penetrant in the ink of the present invention, and the amount added to the ink should preferably be 0 to 30 wt %, and more preferably 0.5 to 10 wt %. If the added amount is over 30 wt %, the area around the nozzles of the ink jet head will be unevenly wetted, making stable discharge difficult.

In addition, the alcohols, nonionic surfactants, water-soluble organic solvents, and other surfactants listed above can similarly be used as a penetrant for the ink of the present invention.

These penetrants can be used singly or in combinations of two or more types in the ink used in the present invention.

The above-mentioned and other surfactants, as well as high-boiling, low-volatility polyhydric alcohols, or monoethers, diethers, or esters thereof, or other such hydrophilic, high-boiling, low-volatility solvents, or the like can be used, singly or in combinations of two or more types, as an auxiliary for the above-mentioned penetrant for the purpose of controlling the permeability of the ink and increasing the clog resistance of the nozzles, the moisture retention of the ink, or the solubility of the penetrant.

Examples of high-boiling, low-volatility polyhydric alcohols that can be used include glycerol, ethylene glycol, diethylene glycol, triethylene glycol, propylene glycol, dipropylene glycol, hexylene glycol, polyethylene glycol, polypropylene glycol, 1,5-pentanediol, and 1,2-hexanediol. Monoethers, diethers, esters, and so forth of these can also be used. It is also possible to use a hydrophilic, high-boiling, low-volatility solvent such as N-methyl-2-pyrrolidone, 2-pyrrolidone, 1,3-dimethylimidazolidinone, monoethanolamine, N,N-dimethylethanolamine, N,N-diethylethanolamine, diethanolamine, N-n-butyldiethanolamine, triisopropanolamine, triethanolamine, and other nitrogen-containing organic solvents.

The ink used in the present invention can also contain, in addition to the water serving as the main solvent, a small amount of ethanol, propanol, isopropanol, butanol, or other such highly volatile monohydric alcohol for the purpose of improving dryability.

A pH buffer can also be used in the ink of the present invention in order to adjust the ink to the optimal pH value. Examples of pH buffers include potassium hydrogenphthalate, potassium dihydrogenphosphate, sodium dihydrogenphosphate, sodium tetraborate, potassium hydrogentartrate, sodium hydrogencarbonate, sodium carbonate, tris(hydroxymethyl)aminomethane, and tris (hydroxymethyl)aminomethane hydrochloride. From the standpoint of the durability of the head members and the stability of the ink, the pH buffer should be contained in an amount such that the pH of the ink is about 7 to 10.

The pigment dispersed liquid of the present invention, and the ink in which it is used, can also contain other additives as needed, such as mildew-proofing agents, preservatives, and rustproofing agents, including benzoic acid, dichlorophene, hexachlorophene, sorbic acid, p-hydroxybenzoic ester, ethylenediamine tetraacetic acid (EDTA), sodium dehydroacetate, 1,2-benzothiazolin-3-one (product name: Proxel XL II (made by ICI)), 3,4-isothiazolin-3-one, oxazoline compounds, alkyl isothiazolone, chloroalkyl isothiazolone, benzisoisothiazolone, bromonitroalcohol, and/or chloroxylenol. Further, urea, thiourea, and/or ethyleneurea or the like can be contained for the purpose of preventing drying in the nozzles.

The properties of the ink used in the present invention can be suitably controlled, and in a preferred mode, the viscosity of the ink should preferably be no more than 10 mPa.sec (25° C.), more preferably 5 mPa.sec or less (25° C.). If the viscosity is within this range, the ink will be discharged stably from the ink discharge head. The surface tension of the ink can also be suitably controlled, and 20 to 50 mN/m (25° C.) is preferable, with 25 to 40 mN/m (25° C.) being even better.

The inventors learned the following in the course of developing the ink-jet recording ink of this invention and the method for manufacturing the ink-jet recording ink.

As mentioned above, the ink-jet printers of today offer higher image quality and speed, and it is difficult to ensure stable discharge characteristics, particularly with a pigment ink. With a surface-treated pigment ink, it is believed that since there is no need to add a resin or the like as a dispersant, such resin does not exist in the ink and, therefore, would barely cause discharge problems. However, the inventors found that if a surface-treated pigment ink manufactured by the conventional method is stored for a long time at high temperatures, solid bits may be generated or the discharge properties may deteriorate. Particularly when ink printing was conducted, after the ink had been set aside at high temperature, by using a printer, which has a small nozzle diameter for high image quality and which has a higher head drive frequency for high speed printing, deflection of ink dots was caused. When printing was resumed after the printer had not been used for an extended period, the nozzles were clogged, thereby causing frequent discharge problems. The inventors found that in order to solve the above-described problems, it is very important to disperse the sulphonated pigment in an aqueous solvent and then to conduct ultrafiltration of the obtained pigment dispersed liquid.

The inventors first predicted a possibility that any solid bits might exist, and conducted filtration by using a filter (pore size: several tens of microns to several microns) at the time of manufacture of the ink, but they could not completely solve the above-described problems. Then, they conducted ultrafiltration in the step of manufacturing the ink or pigment dispersed liquid, and then confirmed that the filtrated liquid contains coloring components, metal ions, and the like. They found that after the removal of the coloring componens, metal ions, and the like, the ink can be stored stably even for a long period of time at high temperatures.

Moreover, the inventors found that concerning the filtrated liquid obtained by filtrating such pigment dispersed liquid with excellent stability, conductivity and absorbance at a maximum absorption wavelength are not more than fixed values.

The inference can be made that such effects are caused as follows:

It is assumed that the ink contains: by-products generated at the time of composition of the pigment, which is a raw material of the ink; by-products generated in the surface treatment such as sulphonating treatment of the pigment particles; or contaminant components such as metallic salts that are mixed in the ink in each step. These by-products or contaminant components normally exist in a dissolved state in the ink and barely have any influence on the dispersion of the pigment particles. However, if the by-products or contaminant components are exposed to a high temperature environment, they can no longer be dissolved in the ink liquid and will come out as solid bits, thereby giving rise to the cause of impairing the storage stability and discharge stability of the ink.

DETAILED DESCRIPTION OF THE PREFERRED EMBODIMENTS

The present invention will now be described specifically through examples, but the scope of the present invention is not limited by these examples.

Measurement of the following respective property values and the operation of the examples were conducted at an environmental temperature of 25° C. by using equipment under the conditions-indicated below:

Average particle diameter with a particle size distribution meter ELS-800 (made by Otsuka Electronics);

Viscosity with a rotational viscometer RFS2 (made by Rheometric) at a shear rate of 200/sec;

Surface tension with a surface tension gage CBVP-A3 (made by Kyowa Interface Science);

Electric conductivity with a conductivity meter SC82 (made by Yokogawa Electric Corp.);

Centrifugal operation with a centrifugal machine CS100 (made by Hitachi, Ltd.); and Absorbance with a spectrophotometer U-3300 (made by Hitachi, Ltd.).

Unless specifically noted, "parts" and "percentage" refer to the values by weight in the explanations of Examples and Comparisons.

Examples 1-1 through 1-11 and Comparisons 1-1 and 1-2 according to this invention will be described below.

EXAMPLE 1-1

(1) Surface Treatment Step (Step A): Carbon Black

Twenty parts carbon black ("MA-100" made by Mitsubishi Chemical) was mixed into 300 parts sulfolane, and grading dispersion was performed for 1 hour in an Eiger Motor Mill model M250 (made by Eiger Japan) at a bead packing level of 70% and a rotation speed of 4500 rpm. The graded and dispersed liquid mixture was transferred to an evaporator, where it was heated to 120° C. under a reduced pressure of 30 mmHg or less, distilling off as much of the water contained in the system as possible, after which the temperature was adjusted to 150° C. Thirty parts sulfur trioxide was then added and allowed to react for 6 hours, and upon completion of the reaction the product was washed several times with an excess of sulfolane and then poured into water and filtered with a Buchner funnel, which yielded a surface-treated carbon black pigment in which sulfur-containing dispersibility-imparting groups such as sulfinic acid ($SO_2^-$) groups or sulfonic acid ($SO_3^-$) groups were directly introduced to the pigment surface.

(2) Dispersion Step (Step B)

Two parts triethanolamine as a neutralizer, and 88 parts ion exchange water were added to 10 parts of the surface-treated carbon black obtained in Example 1-1 (1), and the components were dispersed with a paint shaker (using glass beads, at a bead packing level of 60% and a medium diameter of 1.7 mm) until the average particle diameter of the pigment (the secondary particle diameter) was 100 nm, which yielded a surface-treated carbon black pigment dispersed liquid.

(3) Refining Treatment Step (Step C)

Ultrafiltration (molecular cutoff: 50,000) of the surface-treated carbon black pigment dispersed liquid which was obtained in Example 1-1 (2) was conducted as refining treatment. The rise in the pigment concentration of the refluxed liquid due to the repeated ultrafiltration was adjusted by adding ion exchange water as appropriate. When the conductivity of the filtrated liquid was 1 S/m, the final refluxed liquid was taken out. The pigment concentration of the final refluxed liquid was 10% at that time.

(4) Preparation of Ink-Jet Recording Ink

One part Surfynol 465, 10 parts diethylene glycol mono-n-butyl ether, 15 parts glycerin, 1 part triethanolamine, and 13 parts ion exchange water were gradually added under agitation to 60 parts of the final refluxed liquid (pigment dispersed liquid) obtained in Example 1-1 (3), which yielded the ink of Example 1-1 (pigment concentration: 6%) of the present invention.

The additive composition was as follows:

| | |
|---|---|
| final refluxed liquid | 60 parts |
| Surfynol 465 | 1 part |
| diethylene glycol mono-n-butyl ether | 10 parts |
| glycerin | 15 parts |
| triethanolamine | 1 part |
| ion exchange water | 13 parts |

The final refluxed liquid contains, other than the carbon black pigment (concentration: 10%), triethanolamine and ion exchange water.

EXAMPLE 1-2

(1) Surface Treatment Step (Step A): C.I. Pigment Blue 15:3

Fifteen parts phthalocyanine pigment (C.I. Pigment Blue 15:3) was mixed with 500 parts quinoline, and grading dispersion was performed for 2 hours in an Eiger Motor Mill model M250 (made by Eiger Japan) at a bead packing level of 70% and a rotation speed of 5000 rpm. The graded and dispersed liquid mixture was transferred to an evaporator, where it was heated to 120° C. under a reduced pressure of 30 mmHg or less, distilling off as much of the water contained in the system as possible, after which the temperature was adjusted to 160° C. Twenty-five parts sulfonated pyridine complex was then added and allowed to react for 8 hours, and upon completion of the reaction the product was washed several times with an excess of quinoline and then poured into water and filtered with a Buchner funnel, which yielded a surface-treated phthalocyanine pigment in which sulfur-containing dispersibility-imparting groups such as sulfinic acid ($SO_2^-$) groups or sulfonic acid ($SO_3^-$) groups were directly introduced to the pigment surface.

(2) Dispersion Treatment Step (Step B)

One part Surfynol 440 (made by Air Products) as a wetting agent, 3 parts triethanolamine as a neutralizer, and 86 parts ion exchange water were added to 10 parts of the surface-treated phthalocyanine pigment obtained in Example 1-2 (1), and the components were dispersed with a paint shaker (using glass beads, at a bead packing level of 60% and a medium diameter of 1.7 mm) until the average particle diameter of the pigment (the secondary particle diameter) was 95 nm, which yielded a surface-treated phthalocyanine pigment dispersed liquid in which sulfur-containing dispersibility-imparting groups were introduced.

(3) Refining Treatment Step (Step C)

Ultrafiltration (molecular cutoff: 100,000) of the surface-treated phthalocyanine pigment dispersed liquid which was obtained in Example 1-2 (2) was conducted as refining treatment. The rise in the pigment concentration of the refluxed liquid due to the repeated ultrafiltration was adjusted by adding ion exchange water as appropriate. When the conductivity of the filtrated liquid was 1 S/m, the final refluxed liquid was taken out. The pigment concentration of the final refluxed liquid was 20% at that time. (Accordingly, if the pigment concentration in the refluxed liquid is 10 wt %, the conductivity of the filtrated liquid is 0.5 S/m.)

(4) Preparation of Ink-Jet Recording Ink

To 30 parts of the final refluxed liquid obtained in Example 1-2 (3) were added, gradually under agitation, 0.1 parts Surfynol TG, 10 parts triethylene glycol mono-n-butyl ether, 10 parts glycerin, 5 parts triethylene glycol, and 44.9 parts ion exchange water, which yielded the ink of Example 1-2 (pigment concentration: 6%) of the present invention.

The additive composition was as follows:

| | |
|---|---|
| final refluxed liquid | 30 parts |
| Surfynol TG | 0.1 parts |
| triethylene glycol mono-n-butyl ether | 10 parts |
| glycerin | 10 parts |
| triethylene glycol | 5 parts |
| ion exchange water | 44.9 parts |

The final refluxed liquid contains, other than the phthalocyanine pigment (concentration: 20%), Surfynol 440, triethanolamine and ion exchange water.

EXAMPLE 1-3

(1) Surface Treatment Step (Step A): C.I. Pigment Yellow 110

Twenty parts isoindolinone pigment (C.I. Pigment Yellow 110) was mixed with 450 parts quinoline, and grading dispersion was performed for 2 hours in an Eiger Motor Mill model M250 (made by Eiger Japan) at a bead packing level of 70% and at a rotational speed of 4,000 rpm. The graded and dispersed liquid mixture was transferred to an evaporator, where it was heated to 120° C. under a reduced pressure of 30 mmHg or less, distilling off as much of the water contained in the system as possible, after which the temperature was adjusted to 160° C. Twenty parts sulfonated pyridine complex was then added as a reaction agent and allowed to react for 4 hours, and upon completion of the reaction the product was washed several times with an excess of quinoline and then poured into water and filtered with a Buchner funnel, which yielded a surface-treated isoindolinone yellow pigment in which sulfur-containing dispersibility-imparting groups such as sulfinic acid ($SO_2^-$) groups or sulfonic acid ($SO_3^-$) groups were directly introduced to the pigment surface.

(2) Dispersion Step (Step B)

Two parts propanolamine as a neutralizer, and 78 parts ion exchange water were added to 20 parts of the surface-treated isoindolinone pigment obtained in Example 1-3 (1), and the components were dispersed with a paint shaker (using glass beads, at a bead packing level of 60% and a medium diameter of 1.7 mm) until the average particle diameter of the isoindolinone pigment (the secondary particle diameter) was 105 nm, which yielded a surface-treated isoindolinone pigment dispersed liquid.

(3) Refining Treatment Step (Step C)

Ultrafiltration (molecular cutoff: 500,000) of the surface-treated isoindolinone pigment dispersed liquid which was obtained in Example 1-3 (2) was conducted as refining treatment. The rise in the pigment concentration of the refluxed liquid due to the repeated ultrafiltration was adjusted by adding ion exchange water as appropriate. When the conductivity of the filtrated liquid was 5 S/m, the final refluxed liquid was taken out. The pigment concentration of the final refluxed liquid was 10% at that time.

(4) Preparation of Ink-Jet Recording Ink

To 50 parts of the final refluxed liquid obtained in Example 1-3 (3) were added 0.5 parts Surfynol 82, 2 parts propylene glycol mono-n-butyl ether, 3 parts 1,2-pentanediol, 15 parts glycerin, 0.5 parts triethanolamine, and 29 parts ion exchange water gradually under agitation, which yielded the ink of Example 1-3 (pigment concentration: 5%) of the present invention.

The additive composition was as follows:

| | |
|---|---|
| final refluxed liquid | 50 parts |
| Surfynol 82 | 0.5 parts |
| propylene glycol mono-n-butyl ether | 2 parts |
| 1,2-pentanediol | 3 parts |
| glycerin | 15 parts |
| triethanolamine | 0.5 parts |
| ion exchange water | 29 parts |

The final refluxed liquid contains, other than the surface-treated isoindolinone pigment (concentration: 10%), propanolamine and ion exchange water.

EXAMPLE 1-4
(1) Surface Treatment Step (Step A): C.I. Pigment Yellow 128

Except for the use of condensed azo pigment (C.I. Pigment Yellow 128) as an organic pigment to be treated, the same operation as described in Example 1-3 (1) was repeated, thereby obtaining a surface-treated condensed azo pigment.

(2) Dispersion Step (Step B)

Two parts 2-amino-2-methyl-1-propanol as a neutralizer, 0.1 parts Surfynol TG as a wetting agent, and 82.9 parts ion exchange water were added to 15 parts of the surface-treated condensed azo pigment obtained in Example 1-4 (1), and the components were dispersed with a paint shaker (using glass beads, at a bead packing level of 60% and a medium diameter of 1.7 mm) until the average particle diameter of the azo pigment (the secondary particle diameter) was 100 nm, which yielded a surface-treated condensed azo pigment dispersed liquid.

(3) Refining Treatment Step (Step C)

Ultrafiltration (molecular cutoff: 10,000) of the surface-treated azo pigment dispersed liquid which was obtained in Example 1-4 (2) was conducted as refining treatment. The rise in the pigment concentration of the refluxed liquid due to the repeated ultrafiltration was adjusted by adding ion exchange water as appropriate. When the conductivity of the filtrated liquid was 0.4 S/m, the final refluxed liquid was taken out. The pigment concentration of the final refluxed liquid was 10% at that time.

(4) Preparation of Ink-Jet Recording Ink

One part Surfynol 485 (made by Air Products), 5 parts 1,2-hexanediol, 15 parts glycerin, 1 part triethanolamine, and 18 parts ion exchange water were gradually added under agitation to 60 parts of the final refluxed liquid obtained in Example 1-4 (3), which yielded the ink of Example 1-4 (pigment concentration: 6%) of the present invention.

The additive composition was as follows:

| | |
|---|---|
| final refluxed liquid | 60 parts |
| Surfynol 485 | 1 part |
| 1,2-hexanediol | 5 parts |
| glycerin | 15 parts |
| triethanolamine | 1 part |
| ion exchange water | 18 parts |

The final refluxed liquid contains, other than the surface-treated condensed azo pigment (concentration: 10%), 2-amino-2-methyl-1-propanol, Surfynol TG, and ion exchange water.

EXAMPLE 1-5
(1) Surface Treatment Step (Step A): C.I. Pigment Red 149

Except for the use of perylene pigment (C.I. Pigment Red 149) as an organic pigment to be treated, the same operation as described in Example 1-3 (1) was repeated, thereby obtaining a surface-treated perylene pigment.

(2) Dispersion Step (Step B)

Ten parts aqueous sodium hydroxide solution (10%) as a neutralizer, and 75 parts ion exchange water were added to 15 parts of the surface-treated perylene pigment obtained in Example 1-5 (1), and the components were dispersed with a paint shaker (using glass beads, at a bead packing level of 60% and a medium diameter of 1.7 mm) until the average particle diameter of the pigment (the secondary particle diameter) was 95 nm, which yielded a surface-treated perylene pigment dispersed liquid.

(3) Refining Treatment Step (Step C)

Ultrafiltration (molecular cutoff: 1,000) of the surface-treated perylene pigment dispersed liquid which was obtained in Example 1-4 (2) was conducted as refining treatment. The rise in the pigment concentration of the refluxed liquid due to the repeated ultrafiltration was adjusted by adding ion exchange water as appropriate. When the conductivity of the filtrated liquid was 2 S/m, the final refluxed liquid was taken out. The pigment concentration of the final refluxed liquid was 10% at that time.

(4) Preparation of Ink-Jet Recording Ink

To 60 parts of the final refluxed liquid obtained in Example 1-5 (3) were added 0.5 parts Surfynol 104E (made by Air Products), 3 parts triethylene glycol mono-n-butyl ether, 2 parts 1,2-hexanediol, 15 parts glycerin, 1 part tripropanolamine, and 18.5 parts ion exchange water gradually under agitation, which yielded the ink of Example 1-5 (pigment concentration: 6%) of the present invention.

The additive composition was as follows:

| | |
|---|---|
| final refluxed liquid | 60 parts |
| Surfynol 104E | 0.5 parts |
| triethylene glycol mono-n-butyl ether | 3 parts |
| 1,2-hexanediol | 2 parts |
| glycerin | 15 parts |
| tripropanlamine | 1 part |
| ion exchange water | 18.5 parts |

The final refluxed liquid contains, other than the surface-treated perylene pigment (concentration: 10%), sodium hydroxide and ion exchange water.

EXAMPLE 1-6
(1) Surface Treatment Step (Step A): C.I. Pigment Yellow 147

Except for the use of anthraquinone pigment (C.I. Pigment Yellow 147) as an organic pigment to be treated, the same operation as described in Example 1-3 (1) was repeated, thereby obtaining a surface-treated anthraquinone pigment.

(2) Dispersion Step (Step B)

Two parts N,N-diethylethanolamine as a neutralizer, and 83 parts ion exchange water were added to 15 parts of the surface-treated anthraquinone pigment obtained in Example 1-6 (1), and the components were dispersed with a paint shaker (using glass beads, at a bead packing level of 60% and a medium diameter of 1.7 mm) until the average diameter of the pigment (the secondary particle diameter) was 120 nm, which yielded a surface-treated anthraquinone pigment dispersed liquid.

(3) Refining Treatment Step (Step C)

Ultrafiltration (molecular cutoff: 1,000,000) of the surface-treated anthraquinone pigment dispersed liquid which was obtained in Example 1-6 (2) was conducted as refining treatment. The rise in the pigment concentration of the refluxed liquid due to the repeated ultrafiltration was adjusted by adding ion exchange water as appropriate. When the conductivity of the filtrated liquid was 9.5 S/m, the final refluxed liquid was taken out. The pigment concentration of the final refluxed liquid was 10% at that time.

In this example, the filtration film was easily clogged at the time of repeated ultrafiltration, and it was necessary to change the filtration film many times.

(4) Preparation of Ink-Jet Recording Ink

Five parts diethylene glycol mono-n-butyl ether, 3 parts 1,2-pentanediol, 15 parts glycerin, 1 part propanolamine, and 26 parts ion exchange water were gradually added under agitation to 50 parts of the final refluxed liquid obtained in Example 1-6 (3), which yielded the ink of Example 1-6 (pigment concentration: 5%) of the present invention.

The additive composition was as follows:

| final refluxed liquid | 50 parts |
| diethylene glycol mono-n-butyl ether | 5 parts |
| 1,2-pentanediol | 3 parts |
| glycerin | 15 parts |
| tripropanlamine | 1 part |
| ion exchange water | 26 parts |

The final refluxed liquid contains, other than the surface-treated anthraquinone pigment (concentration: 10%), N,N-diethylethanolamine and ion exchange water.

EXAMPLE 1-7

(1) Surface Treatment Step (Step A): C.I. Pigment Yellow 147

In this Example 1-7, the surface-treated anthraquinone pigment prepared for Example 1-6 (1) was used.

(2) Dispersion Step (Step B)

Two parts N,N-diethylethanolamine as a neutralizer, 0.5 parts Acetylenol EH (made by Kawaken Fine Chemicals) as a wetting agent, and 82.5 parts ion exchange water were added to 15 parts of the surface-treated anthraquinone pigment obtained in Example 1-6 (1), and the components were dispersed with a paint shaker (using glass beads, at a bead packing level of 60% and a medium diameter of 1.7 mm) until the average particle diameter of the pigment (the secondary particle diameter) was 120 nm, which yielded a surface-treated anthraquinone pigment dispersed liquid.

(3) Refining Treatment Step (Step C)

Ultrafiltration (molecular cutoff: 1,000,000) of the surface-treated anthraquinone pigment dispersed liquid which was obtained in Example 1-7 (2) was conducted as refining treatment. The rise in the pigment concentration of the refluxed liquid due to the repeated ultrafiltration was adjusted by adding ion exchange water as appropriate. When the conductivity of the filtrated liquid was 0.9 S/m, the final refluxed liquid was taken out. The pigment concentration of the final refluxed liquid was 10% at that time.

In this Example 1-7, the filtration film was barely clogged at the time of repeated ultrafiltration, and it was possible to promptly conduct the refining treatment of the pigment dispersed liquid.

(4) Preparation of Ink-Jet Recording Ink

Five parts diethylene glycol mono-n-butyl ether, 3 parts 1,2-pentanediol, 15 parts glycerin, 1 part propanolamine, and 26 parts ion exchange water were gradually added under agitation to 50 parts of the final refluxed liquid obtained in Example 1-7 (3), which yielded the ink of Example 1-7 (pigment concentration: 5%) of the present invention.

The additive composition was as follows:

| final refluxed liquid | 50 parts |
| diethylene glycol mono-n-butyl ether | 5 parts |
| 1,2-pentanediol | 3 parts |
| glycerin | 15 parts |
| tripropanlamine | 1 part |
| ion exchange water | 26 parts |

The final refluxed liquid contains, other than the surface-treated anthraquinone pigment (concentration: 10%), N,N-diethylethanolamine, Acetylenol EH, and ion exchange water.

EXAMPLE 1-8

(1) Surface Treatment Step (Step A): C.I. Pigment Yellow 180

Twenty-five parts benzimidazolone pigment (C.I. Pigment Yellow) that had been pulverized into fine particles was mixed with 450 parts quinoline, and these were thoroughly agitated and mixed with a magnetic stirrer. The obtained liquid mixture was transferred to an evaporator, where it was heated to 120° C. under a reduced pressure of 30 mmHg or less, distilling off as much of the water contained in the system as possible, after which the temperature was adjusted to 160° C. Twenty parts sulfonated pyridine complex was then added and allowed to react for 8 hours, and upon completion of the reaction the product was washed several times with an excess of quinoline and then poured into water and filtered with a Buchner funnel, which yielded a surface-treated benzimidazolone pigment in which sulfur-containing dispersibility-imparting groups such as sulfinic acid ($SO_2^-$) groups or sulfonic acid ($SO_3^-$) groups were directly introduced to the pigment surface.

In this example, polyethylene glycol (MW=2000) as a high molecular substance was further introduced to the surface-treated benzimidazolone pigment.

Five parts ethyl p-aminobenzoate and 3 parts concentrated nitric acid were added to 450 parts water and cooled to 5° C. under agitation. The above-mentioned surface-treated benzimidazolone pigment was added to this suspension, an aqueous solution composed of 50 parts water and 2 parts sodium nitrite was slowly added, and the mixture thus obtained was agitated for 10 hours, and this product was repeatedly washed with water and filtered with a Buchner funnel, which yielded a surface-treated benzimidazolone pigment in which ethyl carboxylate groups were introduced via phenyl groups.

Next, 35 parts polyethylene glycol (MW=2000) and 0.4 parts diazabicycloundecene (DBU) were dissolved in 200 parts ethanol, and the surface-treated benzimidazolone pigment synthesized above was gradually added to the mixture, and the mixture thus obtained was agitated. The pH of the mixture was adjusted to 10, and the system was refluxed for 24 hours, after which the mixture thus obtained was repeatedly washed with ethanol and filtered with a Buchner, which ultimately yielded a surface-treated benzimidazolone pigment in which sulfur-containing dispersibility-imparting groups were directly introduced to the surface, and polyethylene oxide propylene oxide benzamide was introduced via phenyl groups.

(2) Dispersion Step (Step B)

Two parts aqueous lithium hydroxide solution (10%) as a neutralizer, and 78 parts ion exchange water were added to 20 parts of the surface-treated benzimidazolone pigment obtained in Example 1-8 (1), and the components were dispersed with a paint shaker (using glass beads, at a bead packing level of 60% and a medium diameter of 1.7 mm) until the average particle diameter of the pigment (the secondary particle diameter) was 120 nm, which yielded a surface-treated benzimidazolone pigment dispersed liquid in which sulfur-containing dispersibility-imparting groups were directly introduced.

(3) Refining Treatment Step (Step C)

Ultrafiltration (molecular cutoff: 1,000,000) of the surface-treated benzimidazolone pigment dispersed liquid which was obtained in Example 1-8 (2) was conducted as refining treatment. The rise in the pigment concentration of the refluxed liquid due to the repeated ultrafiltration was adjusted by adding ion exchange water as appropriate. When the conductivity of the filtrated liquid was 14 S/m, the final refluxed liquid was taken out. The pigment concentration of the final refluxed liquid was 20% at that time. (Accordingly, if the pigment concentration of the refluxed liquid is 10 wt %, the conductivity of the filtrated liquid is 7 S/m.)

(4) Preparation of Ink-Jet Recording Ink

To 30 parts of the final refluxed liquid obtained in Example 1-8 (3) were added 0.5 parts Surfynol 420 (made by Air Products), 2 parts 1,2-hexanediol, 5 parts 2-pyrrolidone, 12.5 parts glycerin, and 50 parts ion exchange water gradually under agitation, which yielded the ink of Example 1-8 (pigment concentration: 6%) of the present invention.

The additive composition was as follows:

| | |
|---|---|
| final refluxed liquid | 30 parts |
| Surfynol 420 | 0.5 parts |
| 1,2-hexanediol | 2 parts |
| 2-pyrrolidone | 5 parts |
| glycerin | 12.5 parts |
| ion exchange water | 50 parts |

The final refluxed liquid contains, other than the surface-treated benzimidazolone pigment (concentration: 20%), lithium hydroxide and ion exchange water.

EXAMPLE 1-9

(1) Surface Treatment Step (Step A): C.I. Pigment Red 122, C.I. Pigment Violet 19

Eighteen parts dimethylquinacridone pigment (C.I. Pigment Red 122) and 2 parts quinacridone pigment were mixed with 500 parts quinoline, and grading dispersion was performed for 2 hours in an Eiger Motor Mill model M250 (made by Eiger Japan) at a bead packing level of 70% and a rotation speed of 5000 rpm. The graded and dispersed liquid mixture was transferred to an evaporator, where it was heated to 120° C. under a reduced pressure of 30 mmHg or less, distilling off as much of the water contained in the system as possible, after which the temperature was adjusted to 160° C. Twenty parts sulfonated pyridine complex was then added as a reaction agent and allowed to react for 4 hours, and upon completion of the reaction the product was washed several times with an excess of quinoline and then poured into water and filtered with a Buchner funnel, which yielded a surface-treated mixed quinacridone pigment.

(2) Dispersion Step (Step B)

Five parts aqueous sodium hydroxide solution (10%) as a neutralizer, and 80 parts ion exchange water were added to 15 parts of the surface-treated mixed quinacridone pigment obtained in Example 1-9 (1), and the components were dispersed with a paint shaker (using glass beads, at a bead packing level of 60% and a medium diameter of 1.7 mm) until the average particle diameter of the pigment (the secondary particle diameter) was 110 nm, which yielded a surface-treated mixed quinacridone pigment dispersed liquid.

(3) Ultrafiltration Step (Step C)

Ultrafiltration (molecular cutoff: 30,000) of the surface-treated quinacridone pigment dispersed liquid which was obtained in Example 1-9 (2) was conducted as refining treatment. The rise in the pigment concentration of the refluxed liquid due to the repeated ultrafiltration was adjusted by adding ion exchange water as appropriate. When the conductivity of the filtrated liquid was 6 S/m, the final refluxed liquid was taken out. The pigment concentration of the final refluxed liquid was 20% at that time. (Accordingly, if the pigment concentration of the refluxed liquid is 10 wt %, the conductivity of the filtrated liquid is 3 S/m.)

(4) Preparation of Ink-Jet Recording Ink

To 30 parts of the final refluxed liquid obtained in Example 1-9 (3) were added, gradually under agitation, 0.5 parts Surfynol TG (made by Air Products), 2 parts propylene glycol mono-n-butyl ether, 3 parts 1,2-hexanediol, 5.5 parts 2-pyrrolidone, 15 parts glycerin, 1 part triethanolamine, and 43 parts ion exchange water, which yielded the ink of Example 1-9 (pigment concentration: 6%) of the present invention.

The additive composition was as follows:

| | |
|---|---|
| final refluxed liquid | 30 parts |
| Surfynol TG | 0.5 parts |
| propylene glycol mono-n-butyl ether | 2 parts |
| 1,2-hexanediol | 3 parts |
| 2-pyrrolidone | 5.5 parts |
| glycerin | 15 parts |
| triethanolamine | 1 part |
| ion exchange water | 43 parts |

The final refluxed liquid contains, other than the surface-treated mixed quinacridone pigment (concentration: 20%), sodium hydroxide and ion exchange water.

EXAMPLE 1-10

(1) Surface Treatment Step (Step A): Carbon Black

Twenty-five parts carbon black pigment ("Special Black 4" made by Degussa) was mixed into 250 parts sulfolane, and grading dispersion was performed for 1 hour in an Eiger Motor Mill model M250 (made by Eiger Japan) at a bead packing level of 70% and a rotation speed of 5000 rpm. The graded and dispersed liquid mixture was transferred to an evaporator, where it was heated to 120° C. under a reduced pressure of 30 mmHg or less, distilling off as much of the water contained in the system as possible, after which the temperature was adjusted to 150° C. Twenty-five parts sulfur trioxide was then added and allowed to react for 6 hours, and upon completion of the reaction the product was washed several times with an excess of sulfolane and then poured into water and filtered with a Buchner funnel, which yielded a surface-treated carbon black pigment in which sulfur-containing dispersibility-imparting groups such as sulfinic acid ($SO_2^-$) groups or sulfonic acid ($SO_3^-$) groups were directly introduced to the pigment surface.

In this example, polyethylene glycol (MW=5000) was further introduced as a high molecular substance to the above-mentioned surface-treated carbon black pigment.

Five parts ethyl p-aminobenzoate and 3 parts concentrated nitric acid were added to 400 parts water and cooled to 5° C. under agitation. The above-mentioned surface-treated carbon black pigment was added to this suspension, an aqueous solution composed of 50 parts water and 2 parts sodium nitrite was slowly added to the mixture, and the mixture thus obtained was agitated for 10 hours, and this product was repeatedly washed with water and filtered with a Buchner funnel, which yielded a surface-treated carbon black pigment in which ethyl carboxylate groups were introduced via phenyl groups.

Subsequently, 40 parts polyethylene glycol (MW=5000) and 0.5 parts diazabicycloundecene (DBU) were dissolved in 200 parts ethanol, and the surface-treated carbon black pigment synthesized above was gradually added and the mixture thus obtained was agitated. The pH of the mixture was adjusted to 10, and the system was refluxed for 24 hours, after which the mixture thus obtained was repeatedly washed with ethanol and then filtered with a Buchner funnel, which ultimately yielded a surface-treated carbon black pigment in which sulfur-containing dispersibility-imparting groups were directly introduced to the surface, and polyethylene oxide propylene oxide benzamide was introduced via phenyl groups.

(2) Dispersion Step (Step B)

To 30 parts of the surface-treated carbon black pigment obtained in Example 1-10 (1) were added 0.5 parts Surfynol 465 (made by Air Products) as a wetting agent, 2.5 parts diethanolamine as a neutralizer, and 67 parts ion exchange water, and the components were dispersed with a paint shaker (using glass beads, at a bead packing level of 60% and a medium diameter of 1.7 mm) until the average particle diameter of the pigment (the secondary particle diameter) was 100 nm, which yielded a surface-treated carbon black pigment dispersed liquid in which sulfur-containing dispersibility-imparting groups were introduced, and polyethylene oxide propylene oxybenzaldehyde was further introduced via phenyl groups.

(3) Ultrafiltration Step (Step C)

Ultrafiltration (molecular cutoff: 30,000) of the surface-treated carbon black pigment dispersed liquid which was obtained in Example 1-10 (2) was conducted. The rise in the pigment concentration of the refluxed liquid due to the repeated ultrafiltration was adjusted by adding ion exchange water as appropriate. When the conductivity of the filtrated liquid was 9 S/m, the final refluxed liquid was taken out. The pigment concentration of the final refluxed liquid was 20% at that time. (Accordingly, if the pigment concentration of the refluxed liquid is 10 wt %, the conductivity of the filtrated liquid is 4.5 S/m.)

(4) Preparation of Ink-Jet Recording Ink

To 30 parts of the final refluxed liquid obtained in Example 1-10 (3) were added, gradually under agitation, 0.5 parts Acetylenol EH (made by Kawaken Fine Chemicals), 2 parts diethylene glycol mono-n-butyl ether, 3 parts 1,2-hexanediol, 15 parts glycerin, 1 part triethanolamine, and 48.5 parts ion exchange water, which yielded the ink of Example 1-10 (pigment concentration: 6%) of the present invention.

the additive composition was as follows:

| | |
|---|---|
| final refluxed liquid | 30 parts |
| Acetylenol EH | 0.5 parts |
| diethylene glycol mono-n-butyl ether | 2 parts |
| 1,2-hexanediol | 3 parts |
| glycerin | 15 parts |
| triethanolamine | 1 part |
| ion exchange water | 48.5 parts |

The final refluxed liquid contains, other than the surface-treated carbon black pigment (concentration: 20%), diethanolamine, Surfynol 465, and ion exchange water.

EXAMPLE 1-11

(1) Surface Treatment Step (Step A): Carbon Black

Twenty parts carbon black ("FW-200" made by Degussa) was mixed into 220 parts water and then pulverized in a ball mill. To this product was added 7 parts p-aminobenzenesulfonic acid and 3 parts nitric acid, and the mixture was agitated for several hours at 75° C. To this was added a 20% sodium nitrite aqueous solution, and the mixture was agitated for another hour. This product was repeatedly washed with water and filtered with a Buchner funnel, which yielded a surface-treated carbon black pigment in which carboxyl groups were introduced via phenyl groups.

(2) Dispersion Step (Step B)

Two parts triethanolamine as a neutralizer, and 78 parts ion exchange water were added to 20 parts of the surface-treated carbon black pigment obtained in Example 1-11 (1), and the components were dispersed with a paint shaker (using glass beads, at a bead packing level of 60% and a medium diameter of 1.7 mm) until the average particle diameter of the pigment (the secondary particle diameter) was 120 nm, which yielded a surface-treated carbon black pigment dispersed liquid in which carboxyl groups were introduced via phenyl groups.

(3) Ultrafiltration Step (Step C)

Ultrafiltration (molecular cutoff: 50,000) of the surface-treated carbon black pigment dispersed liquid which was obtained in Example 1-11 (2) was conducted. The rise in the pigment concentration of the refluxed liquid due to the repeated ultrafiltration was adjusted by adding ion exchange water as appropriate. When the conductivity of the filtrated liquid was 12 S/m, the final refluxed liquid was taken out. The pigment concentration of the final refluxed liquid was 20% at that time. (Accordingly, if the pigment concentration of the refluxed liquid is 10 wt %, the conductivity of the filtrated liquid is 6.5 S/m.)

(4) Preparation of Ink-Jet Recording Ink

To 20 parts of the final refluxed liquid obtained in Example 1-11 (3) were added, gradually under agitation, 0.5 parts Acetylenol EH (made by Kawaken Fine Chemicals), 5 parts triethylene glycol mono-n-butyl ether, 3 parts 1,5-pentanediol, 15 parts glycerin, 1 part triethanolamine, and 55.5 parts ion exchange water, which yielded the ink of Example 1-11 (pigment concentration: 4%) of the present invention.

The additive composition was as follows:

| | |
|---|---|
| final refluxed liquid | 20 parts |
| Acetylenol EH | 0.5 parts |
| triethylene glycol mono-n-butyl ether | 5 parts |
| 1,5-pentanediol | 3 parts |
| glycerin | 15 parts |
| triethanolamine | 1 part |
| ion exchange water | 55.5 parts |

The final refluxed liquid contains, other than the surface-treated carbon black pigment (concentration: 20%), triethanolamine and ion exchange water.

(Comparison 1-1)

(1) Surface Treatment Step (Step A): Carbon Black

In Comparison 1-1, the surface-treated carbon black pigment prepared for Example 1-1 (1) was used.

(2) Dispersion Step (Step B)

Two parts monoethanolamine as a neutralizer, and 78 parts ion exchange water were added to 20 parts of the surface-treated carbon black pigment obtained in Comparison 1-1 (1), and the components were dispersed with a paint shaker (using glass beads, at a bead packing level of 60% and a medium diameter of 1.7 mm) until the average particle diameter of the carbon black pigment (the secondary particle diameter) was 90 nm, which yielded a surface-treated carbon black pigment dispersed liquid.

(3) Refining Treatment Step (Step C)

Ultrafiltration (molecular cutoff: 1,000,000) of the surface-treated carbon black pigment dispersed liquid which was obtained in Comparison 1-1 (2) was conducted as refining treatment. The rise in the pigment concentration of the refluxed liquid due to the repeated ultrafiltration was adjusted by adding ion exchange water as appropriate. However, the filtration film was frequently clogged due to ultrafiltration, and the treatment was then ceased. The conductivity of the filtrated liquid was 100 S/m at that time and the pigment concentration of the final refluxed liquid was 20%. (Accordingly, if the pigment concentration of the refluxed liquid is 10 wt %, the conductivity of the filtrated liquid is 50 S/m.)

(4) Preparation of Ink-Jet Recording Ink

Ten parts ethylene glycol mono-n-butyl ether, 15 parts glycerin, and 45 parts ion exchange water were gradually added under agitation to 30 parts of the final refluxed liquid (pigment dispersed liquid) obtained in Comparison 1-1 (3), which yielded the ink of Comparison 1-1 (pigment concentration: 6%) of the present invention.

The additive composition was as follows:

| | |
|---|---|
| final refluxed liquid | 30 parts |
| ethylene glycol mono-n-butyl ether | 10 parts |
| glycerin | 15 parts |
| ion exchange water | 45 parts |

The final refluxed liquid contains, other than the carbon black pigment (concentration: 20%), monoethanolamine and ion exchange water.

(Comparison 1-2)

(1) Surface Treatment Step (Step A)

In Comparison 1-2, the surface-treated carbon black pigment prepared for Example 1-1 (1) was used.

(2) Dispersion Step (Step B)

In Comparison 1-2, the surface-treated carbon black pigment prepared for Comparison 1-1 (2) was used.

(3) Refining Treatment Step (Step C)

Ultrafiltration (molecular cutoff: 500) of the surface-treated carbon black pigment dispersed liquid which was obtained in Comparison 1-1 (2) was conducted. The rise in the pigment concentration of the refluxed liquid due to the repeated ultrafiltration was adjusted by adding ion exchange water as appropriate. When the conductivity of the filtrated liquid was 6 S/m, the final refluxed liquid was taken out. The pigment concentration of the final refluxed liquid was 5% at that time. (Accordingly, if the pigment concentration of the refluxed liquid is 10 wt %, the conductivity of the filtrated liquid is 12 S/m.)

(4) Preparation of Ink-Jet Recording Ink

Five parts ethylene glycol mono-n-butyl ether, 14 parts glycerin, and 1 part monoethanolamine were gradually added under agitation to 80 parts of the final refluxed liquid obtained in Comparison 1-2 (3), which yielded the ink of Comparison 1-2 (pigment concentration: 4%) of the present invention.

The additive composition was as follows:

| | |
|---|---|
| final refluxed liquid | 80 parts |
| ethylene glycol mono-n-butyl ether | 5 parts |
| glycerin | 14 parts |
| monoethanolamine | 1 part |

The final refluxed liquid contains, other than the carbon black pigment (concentration: 5%), monoethanolamine and ion exchange water.

Concerning the ink of Examples 1-1 through 1-11, and Comparisons 1-1 and 1-2 "test on electric conductivity of ink," "storage stability test," and "printing test" were conducted.

[Test on Electric Conductivity of Ink]

Ion exchange water was added to each ink to adjust the pigment concentration at 16, and the electric conductivity was measured at a temperature of 25° C. by using the conductivity meter SC82 (made by Yokogawa Electric Corp.)

Evaluation criteria were as follows:

"A" refers to the electric conductivity with 1% pigment concentration being less than 0.1 S/m;

"B" refers to the electric conductivity with 1% pigment concentration being in the range of 0.1 S/m to 1 S/m; and "C" refers to the electric conductivity with 1% pigment concentration being more than 1 S/m.

[Storage Stability Test]

The ink was put in a glass sample bottle and allowed to stand for 1 week at 70° C., and the ink was checked for any solid bits generated in the ink and for property values (viscosity, average particle diameter, and surface tension) before and after being allowed to stand. In the evaluation of solid bits, the ink was filtered with a 25 μm crisscrossed filter, after which the amount of solid bits remaining on the filter was observed under a microscope. Each property value was measured with the equipment and by the measuring methods indicated above.

Evaluation criteria were as follows:

"A" refers to the state of almost no generation of solid bits, almost no change in the property values, and good storage stability;

"B" refers to the state of generation of solid bits or some changes in the property values (in either case, changes are subtle without causing any problem from a practical point of view); and "C" refers to the state of generation of solid bits or some changes in the property values (at least in one of these cases, such change may cause problems from a practical point of view.)

[Printing Test]

Using the ink which was allowed to stand for 1 week at a temperature of 70° C. in the above-described storage stability tests, and an EM-900C ink-jet recording printer made by Seiko Epson, a printing test was conducted on different types of paper, namely, Xerox P (made by Fuji Xerox) as neutral ordinary paper, EPP (made by Seiko Epson) as acidic ordinary paper, and Xerox R (made by Fuji Xerox) as recycled paper. Also, the power source of the printer was then left off and the same test was conducted a week after.

Evaluation criteria were as follows:

"A" refers to good printing quality with all the paper types, and no discharge problem observed at the test one week later;

"B" refers to the state in which the printing quality is generally good, but some paper types are of slightly poor quality, causing no problem from a practical point of view; and in which some discharge problems are observed in printing after the printer has been left off for one week, but the discharge property can be restored by repeating cleaning actions several times; and "C" refers to the state in which there are some missing dots in the printed images and good printing quality cannot be obtained; and in which some discharge problems are observed in printing after the printer has been left off for one week, and the discharge property cannot be restored even by repeating cleaning actions several times.

The results of the respective tests are shown in Table 1 indicated later.

Explanations are hereinafter given regarding Examples 2-1 through 2-11, and Comparisons 2-1 through 2-3 of the present invention.

EXAMPLE 2-1

(1) Surface Treatment Step (Step A): Carbon Black

Twenty parts carbon black ("MA-8" made by Mitsubishi Chemical) was mixed into 250 parts sulfolane, and grading dispersion was performed for 1 hour in an Eiger Motor Mill model M250 (made by Eiger Japan) at a bead packing level of 70% and a rotation speed of 4500 rpm. The graded and dispersed liquid mixture was transferred to an evaporator, where it was heated to 120° C. under a reduced pressure of 30 mmHg or less, distilling off as much of the water contained in the system as possible, after which the temperature was adjusted to 150° C. Twenty-five parts sulfur trioxide was then added and allowed to react for 6 hours, and upon completion of the reaction, the product was washed several times with an excess of sulfolane and then poured into water and filtered with a Buchner funnel, which yielded a surface-treated carbon black pigment in which sulfur-containing dispersibility-imparting groups such as sulfinic acid ($SO_2^-$) groups or sulfonic acid ($SO_3^-$) groups were directly introduced to the pigment surface.

(2) Dispersion Step (Step B)

Two parts triethanolamine as a neutralizer, and 88 parts ion exchange water were added to 10 parts of the surface-treated carbon black obtained in Example 2-1 (1), and the components were dispersed with a paint shaker (using glass beads, at a bead packing level of 60% and a medium diameter of 1.7 mm) until the average particle diameter of the pigment (the secondary particle diameter) was 110 nm, which yielded a surface-treated carbon black pigment dispersed liquid.

(3) Refining Treatment Step (Step C)

Ultrafiltration (molecular cutoff: 50,000) of the surface-treated carbon black pigment dispersed liquid which was obtained in Example 2-1 (2) was conducted as refining treatment. The rise in the pigment concentration of the refluxed liquid due to repeated ultrafiltration was adjusted by adding ion exchange water as appropriate. When the absorbance at a maximum absorption wavelength of the coloring component dissolved in the filtrated liquid was 0.60, the final refluxed liquid was taken out. The pigment concentration of the final refluxed liquid was 10% at that time.

(4) Preparation of Ink-Jet Recording Ink

One part Surfynol 465, 10 parts diethylene glycol mono-n-butyl ether, 15 parts glycerin, 1 part triethanolamine, and 13 parts ion exchange water were gradually added under agitation to 60 parts of the final refluxed liquid obtained in Example 2-1 (3), which yielded the ink of Example 2-1 (pigment concentration: 6%) of the present invention.

The additive composition was as follows:

| | |
|---|---|
| final refluxed liquid | 60 parts |
| Surfynol 465 | 1 part |
| diethylene glycol mono-n-butyl ether | 10 parts |
| glycerin | 15 parts |
| triethanolamine | 1 part |
| ion exchange water | 13 parts |

The final refluxed liquid contains, other than the carbon black pigment (concentration: 10%), triethanolamine and ion exchange water.

Ultrafiltration (molecular cutoff: 50,000) of the ink of Example 2-1 was then conducted, and the absorbance at a maximum absorption wavelength of the filtrated liquid was measured, which was 0.38.

EXAMPLE 2-2

(1) Surface Treatment Step (Step A): C.I. Pigment Blue 15:3; C.I. Pigment Blue 15:4

First, 7.5 parts phthalocyanine pigment (C.I. Pigment Blue 15:3) and 7.5 parts phthalocyanine pigment (C.I. Pigment Blue 15:4) were mixed with 450 parts quinoline, and grading dispersion was performed for 2 hours in an Eiger Motor Mill model M250 (made by Eiger Japan) at a bead packing level of 70% and a rotation speed of 5000 rpm. The graded and dispersed liquid mixture was transferred to an evaporator, where it was heated to 120° C. under a reduced pressure of 30 mmHg or less, distilling off as much of the water contained in the system as possible, after which the temperature was adjusted to 160° C. Twenty parts sulfonated pyridine complex was then added and allowed to react for 8 hours, and upon completion of the reaction, the product was washed several times with an excess of quinoline and then poured into water and filtered with a Buchner funnel, which yielded a surface-treated phthalocyanine pigment in which sulfur-containing dispersibility-imparting groups such as sulfinic acid ($SO_2^-$) groups or sulfonic acid ($SO_3^-$) groups were directly introduced to the pigment surface.

(2) Dispersion Treatment Step (Step B)

Two parts diethanolamine as a neutralizer, and 88 parts ion exchange water were added to 10 parts of the surface-treated phthalocyanine pigment obtained in Example 2-2 (1), and the components were dispersed with a paint shaker (using glass beads, at a bead packing level of 60% and a medium diameter of 1.7 mm) until the average particle diameter of the pigment (the secondary particle diameter) was 95 nm, which yielded a surface-treated phthalocyanine pigment dispersed liquid.

(3) Refining Treatment Step (Step C)

Ultrafiltration (molecular cutoff: 100,000) of the surface-treated phthalocyanine pigment dispersed liquid which was obtained in Example 2-2 (2) was conducted as refining treatment. The rise in the pigment concentration of the refluxed liquid due to repeated ultrafiltration was adjusted by adding ion exchange water as appropriate. When the absorbance at a maximum absorption wavelength of the coloring component dissolved in the filtrated liquid was 1.00, the final refluxed liquid was taken out. The pigment concentration of the final refluxed liquid was 20% at that time. (Accordingly, if the pigment concentration in the refluxed liquid is 10 wt % the absorbance of the filtrated liquid is 0.70.)

(4) Preparation of Ink-Jet Recording Ink

To 30 parts of the final refluxed liquid obtained in Example 2-2 (3) were added, gradually under agitation, 0.5 parts Surfynol TG, 10 parts triethylene glycol mono-n-butyl ether, 10 parts glycerin, 5 parts triethylene glycol, and 44.5 parts ion exchange water, which yielded the ink of Example 2-2 (pigment concentration: 6%) of the present invention.

the additive composition was as follows:

| final refluxed liquid | 30 parts |
|---|---|
| Surfynol TG | 0.5 parts |
| triethylene glycol mono-n-butyl ether | 10 parts |
| glycerin | 10 parts |
| triethylene glycol | 5 parts |
| ion exchange water | 44.5 parts |

The final refluxed liquid contains, other than the phthalocyanine pigment (concentration: 20%), diethanolamine and ion exchange water.

Centrifugal ultrafiltration (molecular cutoff: 100,000; centrifugal condition: 3,000 rpm×2 hours) of the ink of Example 2-2 was then conducted, and the absorbance at a maximum absorption wavelength of the filtrated liquid was measured, which was 0.48.

EXAMPLE 2-3

(1) Surface Treatment Step (Step A): C.I. Pigment Yellow

Twenty parts isoindolinone pigment (C.I. Pigment Yellow 109) was mixed with 400 parts quinoline, and grading dispersion was performed for 2 hours in an Eiger Motor Mill model M250 (made by Eiger Japan) at a bead packing level of 70% and a rotational speed of 3,000 rpm. The graded and dispersed liquid mixture was transferred to an evaporator, where it was heated to 120° C. under a reduced pressure of 30 mmHg or less, distilling off as much of the water contained in the system as possible, after which the temperature was adjusted to 150° C. Twenty-five parts sulfonated pyridine complex was then added as a reaction agent and allowed to react for 4 hours, and upon completion of the reaction the product was washed several times with an excess of quinoline and then poured into water and filtered with a Buchner funnel, which yielded a surface-treated isoindolinone pigment in which sulfur-containing dispersibility-imparting groups such as sulfinic acid ($SO_2^-$) groups or sulfonic acid ($SO_3^-$) groups were directly introduced to the pigment surface.

(2) Dispersion Step (Step B)

Two parts tripropanolamine as a neutralizer, and 78 parts ion exchange water were added to 20 parts of the surface-treated isoindolinone pigment obtained in Example 2-3 (1), and the components were dispersed with a paint shaker (using glass beads, at a bead packing level of 60% and a medium diameter of 1.7 mm) until the average particle diameter of the isoindolinone pigment (the secondary particle diameter) was 110 nm, which yielded a surface-treated isoindolinone pigment dispersed liquid.

(3) Refining Treatment Step (Step C)

Ultrafiltration (molecular cutoff: 500,000) of the surface-treated isoindolinone pigment dispersed liquid which was obtained in Example 2-3 (2) was conducted as refining treatment. The rise in the pigment concentration of the refluxed liquid due to repeated ultrafiltration was adjusted by adding ion exchange water as appropriate. When the absorbance at a maximum absorption wavelength of the coloring component dissolved in the filtrated liquid was 0.80, the final refluxed liquid was taken out. The pigment concentration of the final refluxed liquid was 10% at that time.

(4) Preparation of Ink-Jet Recording Ink

To 50 parts of the final refluxed liquid obtained in Example 2-3 (3) were added 0.5 parts Surfynol 82, 2 parts propylene glycol mono-n-butyl ether, 3 parts 1,5-pentanediol, 15 parts glycerin, 0.5 parts triethanolamine, and 29 parts ion exchange water gradually under agitation, which yielded the ink of Example 2-3 (pigment concentration: 5%) of the present invention.

The additive composition was as follows:

| final refluxed liquid | 50 parts |
|---|---|
| Surfynol 82 | 0.5 parts |
| propylene glycol mono-n-butyl ether | 2 parts |
| 1,5-pentanediol | 3 parts |
| glycerin | 15 parts |
| triethanolamine | 0.5 parts |
| ion exchange water | 29 parts |

The final refluxed liquid contains, other than the surface-treated isoindolinone pigment (concentration: 10%), tripropanolamine and ion exchange water.

Centrifugal sedimentation treatment (condition: 80,000 rpm×3 hours) of the ink of Example 2-3 was then conducted, and the absorbance at a maximum absorption wavelength of its supernatant liquid was measured, which was 0.50.

EXAMPLE 2-4

(1) Surface Treatment Step (Step A): C.I. Pigment Brown 32

Except for the use of benzimidazolone pigment (C.I. Pigment Brown 32) as an organic pigment to be treated, the same operation as described in Example 2-3 (1) was repeated, thereby obtaining a surface-treated benzimidazolone pigment.

(2) Dispersion Step (Step B)

Two parts 2-amino-2-methyl-1-propanol as a neutralizer, and 83 parts ion exchange water were added to 15 parts of the surface-treated benzimidazolone pigment obtained in Example 2-4 (1), and the components were dispersed with a paint shaker (using glass beads, at a bead packing level of 60% and a medium diameter of 1.7 mm) until the average particle diameter of the benzimidazolone pigment (the secondary particle diameter) was 110 nm, which yielded a surface-treated benzimidazolone pigment dispersed liquid.

(3) Refining Treatment Step (Step C)

Ultrafiltration (molecular cutoff: 10,000) of the surface-treated benzimidazolone pigment ink which was obtained in Example 2-4 (2) was conducted. The rise in the pigment concentration of the refluxed liquid due to the repeated ultrafiltration was adjusted by adding ion exchange water as appropriate. Centrifugal sedimentation treatment (centrifugal condition: 80,000 rpm×3 hours) of the refluxed liquid was conducted as appropriate. When the absorbance at a maximum absorption wavelength of the coloring component dissolved in the obtained supernatant liquid was 0.50, the refluxed liquid was taken out, which was considered the final refluxed liquid. The pigment concentration of the final refluxed liquid was 10% at that time.

(4) Preparation of Ink-Jet Recording Ink

One part Surfynol 485 (made by Air Products), 5 parts 1,2-hexanediol, 15 parts glycerin, 1 part triethanolamine, and 18 parts ion exchange water were gradually added under agitation to 60 parts of the final refluxed liquid obtained in Example 2-4 (3), which yielded the ink of Example 2-4 (pigment concentration: 6%) of the present invention.

The additive composition was as follows:

| | |
|---|---|
| final refluxed liquid | 60 parts |
| Surfynol 485 | 1 part |
| 1,2-hexanediol | 5 parts |
| glycerin | 15 parts |
| triethanolamine | 1 part |
| ion exchange water | 18 parts |

The final refluxed liquid contains, other than the surface-treated benzimidazolone pigment (concentration: 10%), 2-amino-2-methyl-1-propanol, and ion exchange water.

Ultrafiltration (molecular cutoff: 1,000,000) of the ink of Example 2-4 was then conducted, and the absorbance at a maximum absorption wavelength of the filtrated liquid was measured, which was 0.30.

EXAMPLE 2-5

(1) Surface Treatment Step (Step A): C.I. Pigment Yellow 138

Except for the use of quinophthalone pigment (C.I. Pigment Yellow 138) as an organic pigment to be treated, the same operation as described in Example 2-3 (1) was repeated, thereby obtaining a surface-treated quinophthalone pigment.

(2) Dispersion Step (Step B)

Ten parts aqueous sodium hydroxide solution (10%) as a neutralizer, and 75 parts ion exchange water were added to 15 parts of the surface-treated quinophthalone pigment obtained in Example 2-5 (1), and the components were dispersed with a paint shaker (using glass beads, at a bead packing level of 60% and a medium diameter of 1.7 mm) until the average particle diameter of the pigment (the secondary particle diameter) was 85 nm, which yielded a surface-treated quinophthalone pigment dispersed liquid.

(3) Refining Treatment Step (Step C)

Centrifugal sedimentation filtration (molecular cutoff: 1000; centrifugal condition: 3,000 rpm×2 hours) of the surface-treated quinophthalone pigment ink which was obtained in Example 2-5 (2) was conducted as refining treatment. The rise in the pigment concentration of the refluxed liquid due to the repeated centrifugal sedimentation filtration was adjusted by adding ion exchange water as appropriate. When the absorbance at a maximum absorption wavelength of the coloring component dissolved in the obtained filtrated liquid was 1.00, the surface-treated quinophthalone pigment dispersed liquid was taken out. The pigment concentration was 10%.

(4) Preparation of Ink-Jet Recording Ink

To 80 parts of the surface-treated quinophthalone liquid obtained in Example 2-5 (3) were added 0.5 parts Surfynol 104E (made by Air Products), 3 parts triethylene glycol mono-tert-butyl ether, 2 parts 1,2-hexanediol, 13.5 parts glycerin, and 1 part tripropanolamine gradually under agitation, which yielded the ink of Example 2-5 (pigment concentration: 8%) of the present invention.

The additive composition was as follows:

| surface-treated quinophthalone pigment dispersed | |
|---|---|
| liquid | 80 parts |
| Surfynol 104E | 0.5 parts |
| triethylene glycol mono-tert-butyl ether | 3 parts |
| 1,2-hexanediol | 2 parts |
| glycerin | 13.5 parts |
| tripropanolamine | 1 part |

The surface-treated quinophthalone pigment dispersed liquid contains, other than the surface-treated quinophthalone pigment (concentration: 10%), sodium hydroxide and ion exchange water.

Ultrafiltration (molecular cutoff: 10,000) of the ink of Example 2-5 was conducted, and the absorbance at a maximum absorption wavelength of the filtrated liquid was measured, which was 0.90.

EXAMPLE 2-6

(1) Surface Treatment Step (Step A): C.I. Pigment Green 7

Twenty parts phthalocyanine pigment (C.I. Pigment Green 7) that had been pulverized into fine particles was mixed with 6 parts p-aminobenzenesulfonic acid, and the mixture was heated to 65° C. Eighty parts water and 2 parts aqueous sodium nitrite solution were added rapidly to the above-obtained mixture, thereby obtaining a pigment slurry. Aqueous hydrogen chloride solution was added to the obtained slurry until the pH of the mixture became 2. The mixture was agitated for one hour and then repeatedly washed with water, and filtered, which yielded a surface-treated phthalocyanine pigment in which sulfonic acid groups were introduced via phenyl groups.

(2) Dispersion Step (Step B)

Two parts N,N-diethylethanolamine as a neutralizer, and 83 parts ion exchange water were added to 15 parts of the surface-treated phthalocyanine pigment obtained in Example 2-6 (1), and the components were dispersed with a paint shaker (using glass beads, at a bead packing level of 60% and a medium diameter of 1.7 mm) until the average particle diameter of the pigment (the secondary particle diameter) was 120 nm, which yielded a surface-treated phthalocyanine pigment dispersed liquid.

(3) Refining Treatment Step (Step C)

Centrifugal sedimentation treatment (condition: 30,000 rpm×2 hours) of the surface-treated phthalocyanine pigment dispersed liquid which was obtained in Example 2-6 (2) was conducted as refining treatment. The rise in the pigment concentration of the ink due to the repeated centrifugal sedimentation treatment was adjusted by adding ion exchange water as appropriate. When the absorbance at a maximum absorption wavelength of the coloring component dissolved in the obtained supernatant liquid was 1.00, the surface-treated phthalocyanine pigment dispersed liquid was taken out. The pigment concentration was 20% at that time.

(4) Preparation of Ink-Jet Recording Ink

Five parts diethylene glycol mono-n-butyl ether, 3 parts 1,2-pentanediol, 15 parts glycerin, 1 part propanolamine, and 26 parts ion exchange water were gradually added under agitation to 50 parts of the surface-treated phthalocyanine pigment ink obtained in Example 2-6 (3), which yielded the ink of Example 2-6 (pigment concentration: 5%) of the present invention.

The additive composition was as follows:

| surface-treated phthalocyanine pigment dispersed | |
|---|---|
| liquid | 50 parts |
| diethylene glycol mono-n-butyl ether | 5 parts |
| 1,2-pentanediol | 3 parts |
| glycerin | 15 parts |
| tripropanolamine | 1 part |
| ion exchange water | 26 parts |

The surface-treated phthalocyanine pigment dispersed liquid contains, other than the surface-treated phthalocyanine pigment (concentration: 10%), N,N-diethylethanolamine and ion exchange water.

Centrifugal sedimentation treatment (condition: 80,000 rpm×3 hours) of the ink of Example 2-6 was then conducted, and the absorbance at a maximum absorption wavelength of its supernatant liquid was measured, which was 0.70.

EXAMPLE 2-7

(1) Surface Treatment Step (Step A): C.I. Pigment Red 149

Forty parts perylene scarlet pigment (C.I. Pigment Red 149) that had been pulverized into fine particles was mixed with 5 parts p-aminobenzoic acid. Subsequently, 1.5 parts concentrated nitric acid and 200 parts water were added to the mixture, which was then cooled to 5□. Furthermore, an aqueous solution composed of 1.2 parts sodium nitrite and 50 parts water was slowly added to the above-obtained mixture and was agitated. This mixture was then heated and agitated at a temperature of 70° C. for 8 hours and was allowed to react. After the reaction was completed, the product was repeatedly washed with water and filtered, which yielded a pigment slurry.

Seven parts ethyl p-aminobenzoate, 1.5 parts concentrated nitric acid, 1.2 parts sodium nitrite, and 200 parts water were further added to the above-mentioned pigment slurry, which was allowed to react in the same manner as described above. The obtained product was repeatedly washed with water and filtered, which yielded a surface-treated perylene scarlet pigment in which carboxylic acid groups and ethyl carboxylate groups were introduced via phenyl groups.

In this example, polyethylene glycol (MW=2000) as a high molecular substance was further introduced to the surface-treated perylene scarlet pigment.

Forty parts polyethylene glycol (MW=2000) and 0.3 parts diazabicycloundecene (DBU) were dissolved in 100 parts ethanol, and the surface-treated perylene scarlet pigment synthesized above was gradually added and the mixture agitated. The pH of the mixture was adjusted to 10, and the system was refluxed for 24 hours, after which the mixture thus obtained was repeatedly washed with ethanol and filtered, which ultimately yielded a surface-treated perylene scarlet pigment in which carboxylic acid and polyethylene oxide propylene oxide benzamide were introduced via phenyl groups.

(2) Dispersion Step (Step B)

Ten parts aqueous lithium hydroxide solution (10%) as a neutralizer, and 75 parts ion exchange water were added to 15 parts of the surface-treated perylene scarlet pigment obtained in Example 2-7 (1), and the components were dispersed with a paint shaker (using glass beads, at a bead packing level of 60% and a medium diameter of 1.7 mm) until the average particle diameter of the pigment (the secondary particle diameter) was 105 nm, which yielded a surface-treated perylene scarlet pigment dispersed liquid.

(3) Refining Treatment Step (Step C)

Ultrafiltration (molecular cutoff: 100,000) of the surface-treated perylene scarlet pigment dispersed liquid which was obtained in Example 2-7 (2) was conducted as refining treatment. The rise in the pigment concentration of the refluxed liquid due to the repeated ultrafiltration was adjusted by adding ion exchange water as appropriate. Then, centrifugal filtration (molecular cutoff: 100,000; centrifugal condition: 3,000 rpm×2 hours) of the refluxed liquid was conducted as appropriate. When the absorbance at a maximum absorption wavelength of the coloring component dissolved in the obtained filtrated liquid was 1.00, the refluxed liquid was taken out, which was considered the final refluxed liquid. The pigment concentration of the final refluxed liquid was 20% at that time. (Accordingly, if the pigment concentration of the refluxed liquid is 10 wt %, the absorbance of the filtrated liquid is 0.70.)

(4) Preparation of Ink-Jet Recording Ink

One part Acetylenol EH (made by Kawaken Fine Chemicals), 4 parts 1,2-hexanediol, 15 parts glycerin, and 50 parts ion exchange water were gradually added under agitation to 30 parts of the final refluxed liquid obtained in Example 2-7 (3), which yielded the ink of Example 2-7 (pigment concentration: 6%) of the present invention.

The additive composition was as follows:

| final refluxed liquid | 30 parts |
|---|---|
| Acetylenol EH | 1 part |
| 1,2-hexanediol | 4 parts |
| glycerin | 15 parts |
| ion exchange water | 50 parts |

The final refluxed liquid contains, other than the surface-treated perylene scarlet pigment (concentration: 20%), lithium hydroxide and ion exchange water.

Centrifugal sedimentation treatment (molecular cutoff: 1,000; centrifugal condition: 3,000 rpm×3 hours) of the ink of Example 2-7 was then conducted, and the absorbance at a maximum absorption wavelength of the filtrated liquid was measured, which was 0.48.

EXAMPLE 2-8

(1) Surface Treatment Step (Step A): C.I. Pigment Red 209

Twenty parts dichloroquinacridone pigment (C.I. Pigment Red 209) was mixed with 500 parts quinoline, and grading dispersion was performed for 2 hours in an Eiger Motor Mill model M250 (made by Eiger Japan) at a bead packing level of 70% and a rotation speed of 5000 rpm. The graded and dispersed liquid mixture was transferred to an evaporator, where it was heated to 120° C. under a reduced pressure of 30 mmHg or less, distilling off as much of the water contained in the system as possible, after which the temperature was adjusted to 150° C. Twenty parts sulfonated pyridine complex was then added as a reaction agent and allowed to react for 4 hours, and upon completion of the reaction the product was washed several times with an excess of quinoline and then poured into water and filtered with a Buchner funnel, which yielded a surface-treated dichloroquinacridone pigment in which sulfur-containing dispersibility-imparting groups such as sulfinic acid ($SO_2^-$) groups or sulfonic acid ($SO_3^-$) groups were directly introduced to the pigment surface.

(2) Dispersion Step (Step B)

Five parts aqueous sodium hydroxide solution (10%) as a neutralizer, and 80 parts ion exchange water were added to 15 parts of the surface-treated dichloroquinacridone pigment obtained in Example 2-8 (1), and the components were dispersed with a paint shaker (using glass beads, at a bead packing level of 60% and a medium diameter of 1.7 mm) until the average particle diameter of the pigment (the secondary particle diameter) was 110 nm, which yielded a surface-treated dichloroquinacridone pigment dispersed liquid.

(3) Refining Treatment Step (Step C)

Ultrafiltration (molecular cutoff: 30,000) of the surface-treated dichloroquinacridone pigment dispersed liquid which was obtained in Example 2-8 (2) was conducted as refining treatment. The rise in the pigment concentration of the refluxed liquid due to the repeated ultrafiltration was adjusted by adding ion exchange water as appropriate. Then, centrifugal ultrafiltration (molecular cutoff: 30,000; centrifugal condition: 3,000 rpm×2 hours) of the refluxed liquid was conducted as appropriate. When the absorbance at a maximum absorption wavelength of the coloring component dissolved in the obtained filtrated liquid was 0.60, the refluxed liquid was taken out, which was considered the final refluxed liquid. The pigment concentration of the final refluxed liquid was 20% at that time. (Accordingly, if the pigment concentration of the refluxed liquid is 10 wt %, the absorbance of the filtrated liquid is 0.30.)

(4) Preparation of Ink-Jet Recording Ink

To 30 parts of the final refluxed liquid obtained in Example 2-8 (3) were added 0.8 parts Surfynol 61 (made by Air Products), 2 parts propylene glycol mono-n-butyl ether, 2.2 parts 1,2-hexanediol, 5 parts thiodiglycol, 10 parts glycerin, 1.5 parts triethanolamine, and 48.5 parts ion exchange water gradually under agitation, which yielded the ink of Example 2-8 (pigment concentration: 6%) of the present invention.

The additive composition was as follows:

| | |
|---|---|
| final refluxed liquid | 30 parts |
| Surfynol 61 | 0.8 parts |
| propylene glycol mono-n-butyl ether | 2 parts |
| 1,2-hexanediol | 2.2 parts |
| thiodiglycol | 5 parts |
| glycerin | 10 parts |
| triethanolamine | 1.5 parts |
| ion exchange water | 48.5 parts |

The final refluxed liquid contains, other than the surface-treated dichloroquinacridone pigment (concentration: 20%), sodium hydroxide and ion exchange water.

Centrifugal sedimentation treatment (condition: 80,000 rpm×3 hours) of the ink of Example 2-8 was then conducted. As a result of measurement of the absorbance at a maximum absorption wavelength of its supernatant liquid, the absorbance of the coloring component dissolved in the filtrated liquid was 0.10.

EXAMPLE 2-9

(1) Surface Treatment Step (Step A): C.I. Pigment Red 209

Twenty parts dichloroquinacridone pigment (C.I. Pigment Red 209) was mixed with 500 parts quinoline, and grading dispersion was performed for 2 hours in an Eiger Motor Mill model M250 (made by Eiger Japan) at a bead packing level of 70% and a rotation speed of 5000 rpm. The graded and dispersed liquid mixture was transferred to an evaporator, where it was heated to 120° C. under a reduced pressure of 30 mmHg or less, distilling off as much of the water contained in the system as possible, after which the temperature was adjusted to 150° C. Twenty parts sulfonated pyridine complex was then added as a reaction agent and allowed to react for 4 hours, and upon completion of the reaction the product was washed several times with an excess of quinoline and then poured into water and filtered with a Buchner funnel. The obtained pigment particles were further put in ion exchange water and the filtering operation with a Buchner funnel was repeated several times. Subsequently, the pigment particles were put in an aqueous solution made by adding 0.1 parts sodium hydroxide (0.01% aqueous solution) to 99.9% ion exchange water, and this product was agitated and mixed for a while and was then filtered with a Buchner funnel, which yielded a surface-treated dichloroquinacridone pigment in which sulfur-containing dispersibility-imparting groups such as sulfinic acid ($SO_2^-$) groups or sulfonic acid ($SO_3^-$) groups were directly introduced to the pigment surface.

(2) Dispersion Step (Step B)

Five parts aqueous sodium hydroxide solution (10%) as a neutralizer, and 80 parts ion exchange water were added to 15 parts of the surface-treated dichloroquinacridone pigment obtained in Example 2-9 (1), and the components were dispersed with a paint shaker (using glass beads, at a bead packing level of 60% and a medium diameter of 1.7 mm) until the average particle diameter of the pigment (the secondary particle diameter) was 100 nm, which yielded a surface-treated dichloroquinacridone pigment dispersed liquid.

(3) Refining Treatment Step (Step C)

Ultrafiltration (molecular cutoff: 50,000) of the surface-treated dichloroquinacridone pigment dispersed liquid thus obtained was conducted. As a result of measurement of the content of a coloring component dissolved in the filtrated liquid, the absorbance at a maximum absorption wavelength was 1.10. (Accordingly, if the pigment concentration of the dispersed liquid is 10 wt %, the absorbance of the filtrated liquid is 0.92.)

(4) Preparation of Ink-Jet Recording Ink

One part Surfynol 465 (made by Air Products), 1 part triethylene glycol mono-n-butyl ether, 3 parts 1,2-hexanediol, 10 parts glycerin, 5 parts triethylene glycol, 1 part triethanolamine, and 49 parts ion exchange water were gradually added under agitation to 30 parts of the surface-treated dichloroquinacridone pigment dispersed liquid obtained in Example 2-9 (3), which yielded the ink of Example 2-9 (pigment concentration: 6%) of the present invention.

The additive composition was as follows:

| | |
|---|---|
| surface-treated dichloroquinacridone pigment dispersed liquid | 30 parts |
| Surfynol 465 | 1 part |
| triethylene glycol mono-n-butyl ether | 1 part |
| 1,2-hexanediol | 3 parts |
| glycerin | 10 parts |
| triethylene glycol | 5 parts |
| triethanolamine | 1 part |
| ion exchange water | 49 parts |

The surface-treated dichloroquinacridone pigment dispersed liquid contains, other than the surface-treated dichloroquinacridone pigment (concentration: 20%), sodium hydroxide and ion exchange water.

Centrifugal sedimentation treatment (condition: 80,000 rpm×3 hours) of the ink of Example 2-9 was then conducted. As a result of measurement of the absorbance at a maximum absorption wavelength of its supernatant liquid, the content of the coloring component dissolved in the filtrated liquid was 0.68.

EXAMPLE 2-10

(1) Surface Treatment Step (Step A): C.I. Pigment Red 209

The surface-treated dichloroquinacridone pigment made in Example 2-8 (1) was used without any adjustment in this Example 2-10 (1).

(2) Dispersion Step (Step B)

The surface-treated dichloroquinacridone pigment dispersed liquid obtained in Example 2-8 (2) was used without any adjustment in this Example 2-10 (2).

(3) Refining Treatment Step (Step C)

Ultrafiltration (molecular cutoff: 1,000,000) of the surface-treated dichloroquinacridone pigment dispersed liquid which was obtained in Example 2-8 (2) was conducted as refining treatment. The rise in the pigment concentration of the refluxed liquid due to the repeated ultrafiltration was adjusted by adding ion exchange water as appropriate. When the absorbance at a maximum absorption wavelength of the coloring component dissolved in the obtained filtrated liquid was 1.30, the refluxed liquid was taken out, which was considered the final refluxed liquid. The pigment concentration of the final reflux fluid was 20% at that time. (Accordingly, if the pigment concentration of the refluxed liquid is 10 wt %, the absorbance of the filtrated liquid is 1.00.)

In this example, the ultrafiltration film was easily clogged at the time of repeated ultrafiltration in this refining treatment Step And it was necessary to change the ultrafiltration film many times.

(4) Preparation of Ink-Jet Recording Ink

To 50 parts of the final refluxed liquid obtained in Example 2-10 (3) were added 0.5 parts Surfynol TG (made by Air Products), 10 parts diethylene glycol mono-n-butyl ether, 15 parts glycerin, 1 part triethanolamine, and 23.5 parts ion exchange water gradually under agitation, which yielded the ink of Example 2-10 (pigment concentration: 10%) of the present invention.

The additive composition was as follows:

| | |
|---|---|
| final refluxed liquid | 50 parts |
| Surfynol TG | 0.5 parts |
| diethylene glycol mono-n-butyl ether | 10 parts |
| glycerin | 15 parts |
| triethanolamine | 1 part |
| ion exchange water | 23.5 parts |

The final refluxed liquid contains, other than the surface-treated dichloroquinacridone pigment (concentration: 20%), sodium hydroxide and ion exchange water.

Centrifugal sedimentation treatment (condition: 80,000 rpm×3 hours) of the ink of Example 2-10 was then conducted. As a result of measurement of the absorbance at a maximum absorption wavelength of its supernatant liquid, the content of the coloring component dissolved in the filtrated liquid was 1.00.

EXAMPLE 2-11

(1) Surface Treatment Step (Step A): C.I. Pigment Orange 36

Twenty-five parts benzimidazolone pigment (C.I. Pigment Orange 36) that had been pulverized into fine particles and 65 parts p-amino-N-ethyl pyridinium bromide were mixed with and dispersed in 150 parts water, and 35 parts nitric acid was dripped in the mixture obtained above, which was then agitated for 5 minutes at a temperature of 75° C. An aqueous sodium nitrite solution was added to the mixture, which was further agitated for 2 hours. This product was then repeatedly washed with water and filtered, which yielded a surface-treated benzimidazolone pigment in which N-ethyl pyridyl groups were introduced via phenyl groups.

(2) Dispersion Step (Step B)

Two parts aqueous ammonium hydroxide solution (10%) as a neutralizer, and 78 parts ion exchange water were added to 20 parts of the surface-treated benzimidazolone pigment obtained in Example 2-11 (1), and the components were dispersed with a paint shaker (using glass beads, at a bead packing level of 60% and a medium diameter of 1.7 mm) until the average particle diameter of the pigment (the secondary particle diameter) was 120 nm, which yielded a surface-treated benzimidazolone pigment dispersed liquid.

(3) Refining Treatment Step (Step C)

Centrifugal ultrafiltration (molecular cutoff: 1,000; centrifugal condition: 3,000 rpm×2 hours) of the surface-treated benzimidazolone pigment dispersed liquid which was obtained in Example 2-11 (2) was conducted as refining treatment. The rise in the pigment concentration of the ink due to repeated centrifugal ultrafiltration was adjusted by adding ion exchange water as appropriate. When the absorbance at a maximum absorption wavelength of the coloring component dissolved in the filtrated liquid was 0.95, the surface-treated benzimidazolone pigment dispersed liquid was taken out. The pigment concentration of the dispersed liquid was 10%.

(4) Preparation of Ink-Jet Recording Ink

To 60 parts of the surface-treated benzimidazolone pigment dispersed liquid obtained in Example 2-11 (3) were added 0.5 parts Surfynol 104E (made by Air Products), 3 parts triethylene glycol mono-n-butyl ether, 2 parts 1,2-hexanediol, 13.5 parts glycerin, 1 part tripropanolamine, and 20 parts ion exchange water gradually under agitation, which yielded the ink of Example 2-11 (pigment concentration: 6%) of the present invention.

The additive composition was as follows:

| | |
|---|---|
| surface-treated benzimidazolone pigment dispersed liquid | 60 parts |
| Surfynol 104E | 0.5 parts |
| triethylene glycol mono-n-butyl ether | 3 parts |
| 1,2-hexanediol | 2 parts |
| glycerin | 13.5 parts |
| tripropanolamine | 1 part |
| ion exchange water | 20 parts |

The surface-treated benzimidazolone pigment dispersed liquid contains, other than the surface-treated benzimidazolone pigment (concentration: 10%), ammonium hydroxide and ion exchange water.

Ultrafiltration (molecular cutoff: 10,000) of the ink of Example 2-11 was then conducted, and the absorbance at a maximum absorption wavelength of the filtrated liquid was measured, which was 0.90.

(Comparison 2-1)

(1) Surface Treatment Step (Step A): Carbon Black

In Comparison 2-1, the surface-treated carbon black pigment prepared for Example 2-1 (1) was used.

(2) Dispersion Step (Step B)

Two parts monoethanolamine as a neutralizer, and 88 parts ion exchange water were added to 20 parts of the surface-treated carbon black pigment obtained in Comparison 2-1 (1), and the components were dispersed with a paint shaker (using glass beads, at a bead packing level of 60% and a medium diameter of 1.7 mm) until the average particle diameter of the carbon black pigment (the secondary particle diameter) was 90 nm, which yielded a surface-treated carbon black pigment dispersed liquid.

(3) Refining Treatment Step (Step C)

Ultrafiltration (molecular cutoff: 1,000,000) of the surface-treated carbon black pigment dispersed liquid which was obtained in Comparison 2-1 (2) was conducted as refining treatment. The rise in the pigment concentration of the refluxed liquid due to the repeated ultrafiltration was adjusted by adding ion exchange water as appropriate. However, the filtration film was frequently clogged due to ultrafiltration, and the treatment was then ceased. At that time, the absorbance at a maximum absorption wavelength of the coloring component dissolved in the filtrated liquid was 1.80, and the pigment concentration of the final refluxed liquid was 20% then. (Accordingly, if the pigment concentration of the refluxed liquid is 10 wt %, the absorbance of the coloring component in the filtrated liquid is 1.50.)

(4) Preparation of Ink-Jet Recording Ink

Ten parts ethylene glycol mono-n-butyl ether, 15 parts glycerin, and 45 parts ion exchange water were gradually added under agitation to 30 parts of the final refluxed liquid obtained in Comparison 2-1 (3), which yielded the ink of Comparison 2-1 (pigment concentration: 6%) of the present invention.

The additive composition was as follows:

| | |
|---|---|
| final refluxed liquid | 30 parts |
| ethylene glycol mono-n-butyl ether | 10 parts |
| glycerin | 15 parts |
| ion exchange water | 45 parts |

The final refluxed liquid contains, other than the carbon black pigment (concentration: 20%), monoethanolamine and ion exchange water.

Ultrafiltration (molecular cutoff: 50,000) of the ink of Comparison 2-1 was then conducted, and the absorbance at a maximum absorption wavelength of the filtrated liquid was measured, which was 1.30.

(Comparison 2-2)

(1) Surface Treatment Step (Step A)

In Comparison 2-2, the surface-treated carbon black pigment made in Example 2-1 (1) was used without any adjustment.

(2) Dispersion Step (Step B)

In Comparison 2-2, the surface-treated carbon black pigment made in Comparison 2-1 (2) was used without any adjustment.

(3) Refining Treatment Step (Step C)

Ultrafiltration (molecular cutoff: 500) of the surface-treated carbon black pigment dispersed liquid which was obtained in Comparison 2-1 (2) was conducted as refining treatment. The rise in the pigment concentration of the refluxed liquid due to the repeated ultrafiltration was adjusted by adding ion exchange water as appropriate. When the absorbance at a maximum absorption wavelength of the coloring component dissolved in the filtrated liquid was 0.50, the final refluxed liquid was taken out. The pigment concentration of the final refluxed liquid was 5%. (Accordingly, if the pigment concentration of the refluxed liquid is 10 wt %, the absorbance of the filtrated liquid is 0.80.)

(4) Preparation of Ink-Jet Recording Ink

Five parts ethylene glycol mono-n-butyl ether, 14 parts glycerin, and 1 part monoethanolamine were gradually added under agitation to 80 parts of the final refluxed liquid obtained in Comparison 2-2 (3), which yielded ink of Comparison 2-2 (pigment concentration: 4%) of the present invention.

The additive composition was as follows:

| | |
|---|---|
| final refluxed liquid | 80 parts |
| ethylene glycol mono-n-butyl ether | 5 parts |
| glycerin | 14 parts |
| monoethanolamine | 1 part |

The final refluxed liquid contains, other than the carbon black pigment (concentration: 5%), monoethanolamine and ion exchange water.

Ultrafiltration (molecular cutoff: 50,000) of the ink of Comparison 2-2 was then conducted. As a result of measurement of the absorbance at a maximum absorption wavelength of the filtrated liquid, the content of the coloring component dissolved in the filtrated liquid was 1.10.

(Comparison 2-3)

(1) Surface Treatment Step (Step A)

In Comparison 2-3, the surface-treated carbon black pigment made in Example 2-1 (1) was used without any adjustment.

(2) Dispersion Step (Step B)

In Comparison 2-3, the surface-treated carbon black pigment ink made in Comparison 2-1 (2) was used without any adjustment. Ultrafiltration (molecular cutoff: 50,000) of the ink was then conducted. As a result of measurement of the content of the coloring component dissolved in the filtrated liquid, the absorbance at a maximum absorption wavelength was 2.00. (Accordingly, if the pigment concentration of the final refluxed liquid is 10 wt %, the absorbance of the filtrated liquid is 1.70.)

(3) Preparation of Ink-Jet Recording Ink

Five parts ethylene glycol mono-n-butyl ether, 15 parts glycerin, 1 part monoethanolamine, and 39 parts ion exchange water were gradually added under agitation to 40 parts of the surface-treated carbon black pigment dispersed liquid obtained in Comparison 2-3 (2), which yielded ink of Comparison 2-3 (pigment concentration: 8%) of the present invention.

The additive composition was as follows:

| | |
|---|---|
| surface-treated carbon black pigment dispersed liquid | 40 parts |
| ethylene glycol mono-n-butyl ether | 5 parts |
| glycerin | 15 parts |
| monoethanolamine | 1 part |
| ion exchange water | 39 parts |

The surface-treated carbon black pigment dispersed liquid contains, other than the carbon black pigment (concentration: 20%), monoethanolamine and ion exchange water.

Ultrafiltration (molecular cutoff: 50,000) of the ink of Comparison 2-3 was then conducted. When the absorbance at a maximum absorption wavelength of the filtrated liquid was measured, the content of the coloring component dissolved in the filtrated liquid was 1.60.

Concerning the ink of Examples 2-1 through 2-11, and Comparisons 2-1 through 2-3, "storage stability test," and "printing test" were conducted. Testing methods and evaluation criteria are indicated below.

[Storage Stability Test]

The ink obtained in Examples 2-1 through 2-11, and Comparisons 2-1 through 2-3 was respectively put in glass sample bottles and allowed to stand for 1 week at 70° C., and the ink was checked for any solid bits generated in the ink and for property values (viscosity, average particle diameter, and surface tension) before and after being allowed to stand. In the evaluation of solid bits, the ink was filtered with a 25 µm crisscrossed filter, after which the amount of solid bits remaining on the filter was observed under a microscope. Each property value was measured with the equipment and by the measuring methods previously described.

Evaluation criteria were as follows:

"A" refers to the state of almost no generation of solid bits, almost no change in the property values, and good storage stability;

"B" refers to the state of generation of solid bits or some changes in the property values (in either case, changes are subtle without causing any problem from a practical point of view); and "C" refers to the state of generation of solid bits or some changes in the property values (at least in one of these cases, such changes may cause problems from a practical point of view.)

[Printing Test]

Using the ink which was allowed to stand for 1 week at a temperature of 70° C. in the above-described storage stability test, in an EM-900C ink-jet recording printer made by Seiko Epson, a printing test was conducted on different types of paper, namely, Xerox P (made by Fuji Xerox) as neutral ordinary paper, EPP (made by Seiko Epson) as acidic ordinary paper, and Xerox R (made by Fuji Xerox) as recycled paper. Also, the power source of the printer was then left off and the same test was conducted a week later.

Evaluation criteria were as follows:

"A" refers to good printing quality with all the paper types, and no discharge problem observed at the test one week later;

"B" refers to the state in which the printing quality is generally good, but some paper types are of slightly poor quality, causing no problem from a practical point of view; and in which some discharge problems are observed in printing after the printer has been left off for one week, but the discharge property can be restored by repeating cleaning actions several times; and "C" refers to the state in which there are some missing dots in the printed images and good printing quality cannot be obtained; and in which some discharge problems are observed in printing after the printer has been left off for one week, and the discharge property cannot be restored even by repeating cleaning actions several times.

The results of the respective tests are shown in Table 2 indicated below. Table 2 also shows the absorbance of the coloring component dissolved in the ink described in Examples 2-1 through 2-11, and Comparisons 2-1 through 2-3.

INDUSTRIAL APPLICABILITY

The ink of the present invention can realize excellent storage stability and afford better printed images. Moreover, this invention makes it possible to obtain a pigment ink used for ink-jet printers that can maintain stable printing properties, even after having been left aside at high temperatures, in a modern ink-jet printer having an ink jet head that is driven at a high frequency, and a small nozzle diameter for the purposes of attaining higher image quality and speed.

TABLE 1

|  | Electrical Conductivity of Filtrated liquid | Test on Electrical Conductivity of Ink | Storage Stability Test | Printing Test |
| --- | --- | --- | --- | --- |
| Ex. 1-1 | 1 S/m | A | A | A |
| Ex. 1-2 | 0.5 S/m | A | A | A |
| Ex. 1-3 | 5 S/m | A | A | A |
| Ex. 1-4 | 0.4 S/m | A | A | A |
| Ex. 1-5 | 2 S/m | B | B | B |
| Ex. 1-6 | 9.5 S/m | B | B | B |
| Ex. 1-7 | 0.9 S/m | A | A | A |
| Ex. 1-8 | 7 S/m | B | A | B |
| Ex. 1-9 | 3 S/m | A | A | A |
| Ex. 1-10 | 4.5 S/m | A | A | A |
| Ex. 1-11 | 6 S/m | A | B | A |
| Com. 1-1 | 50 S/m | C | C | C |
| Com. 1-2 | 12 S/m | C | C | C |

TABLE 2

| | Absorbance of Coloring Component | | | |
| --- | --- | --- | --- | --- |
|  | When the pigment concentration in a dispersed liquid is converted to 10 wt % | Absorbance of the coloring component in ink | Storage Stability Test | Printing Test |
| Ex. 2-1 | 0.60 | 0.38 | A | A |
| Ex. 2-2 | 0.70 | 0.48 | A | A |
| Ex. 2-3 | 0.80 | 0.50 | A | A |
| Ex. 2-4 | 0.50 | 0.30 | A | A |
| Ex. 2-5 | 1.00 | 0.90 | B | B |
| Ex. 2-6 | 1.00 | 0.70 | B | B |
| Ex. 2-7 | 0.70 | 0.48 | A | A |
| Ex. 2-8 | 0.30 | 0.10 | A | A |
| Ex. 2-9 | 0.92 | 0.68 | B | B |
| Ex. 2-10 | 1.00 | 1.00 | B | B |
| Ex. 2-11 | 0.95 | 0.90 | B | B |
| Com. 2-1 | 1.50 | 1.30 | C | C |
| Com. 2-2 | 0.80* | 1.10 | C | C |
| Com. 2-3 | 1.70 | 1.60 | C | C |

*As a test sample, the filtrated liquid obtained in ultrafiltration (by using an ultrafiltration film with a molecular cutoff of 500) was used.

What is claimed is:

1. A method for manufacturing a pigment dispersed liquid, comprising the steps of:

(A) introducing a hydrophilic dispersibility-imparting group directly and/or via another atomic group to the surface of pigment particles;

(B) dispersing the pigment particles obtained in Step A in an aqueous medium to obtain a dispersed liquid; and (C) conducting a refining treatment of the dispersed liquid comprising (i) subjecting the dispersed liquid to ultra filtration in which an ultrafiltration film is used to separate the dispersed liquid into the pigment dispersed liquid that does not permeate through the ultrafiltration film and a filtrated liquid comprising impurities that permeate through the ultrafiltration film and a filtrated liquid comprising impurities that permeate through the ultrafiltration film, and (ii) recovering the pigment dispersed liquid, wherein the ultrafiltration film has a molecular cutoff size that results in the filtrated liquid having an absorbance which, at a maximum absorption wavelength, is 1.0 or less when a pigment concentration in the pigment dispersed liquid is converted to 10 wt. %.

2. The method for manufacturing a pigment dispersed liquid according to claim 1, wherein the pigment in which the hydrophilic, dispersibility-imparting group has been introduced directly and/or via another atomic group in Step A is a carbon black pigment and/or an organic pigment.

3. The method for manufacturing a pigment dispersed liquid according to claim 1, wherein the pigment in which the hydrophilic, dispersibility-imparting group has been introduced directly and/or via another atomic group in Step A is one or more pigments selected from the group consisting of C.I. pigment yellow, C.I. pigment red, C.I. pigment violet, C.I. pigment blue, C.I. pigment orange, C.I. pigment green, and C.I. pigment brown.

4. The method for manufacturing a pigment dispersed liquid according to claim 1, wherein the pigment in which the hydrophilic, dispersibility-imparting group has been introduced directly and/or via another atomic group in Step A is one or more pigments selected from the group consisting at phthalocyanine pigment, quinacridone pigment, condensed azo pigment, isoindolinone pigment, quinophthalone pigment, anthraquinone pigment, benzimidazolone pigment, and perylene pigment.

5. The method for manufacturing a pigment dispersed liquid according to claim 1 wherein the hydrophilic, dispersibility-imparting group introduced to the pigment surface directly and/or via another atomic group in Step A is one or more selected from the group consisting of functional groups expressed by the following formulas or salts thereof: —OM, —COOM, —CO—, —SO$_3$M—, —SO$_2$M,—SO$_2$NH$_2$, —RSO$_2$M, —PO$_3$HM, —PO$_3$M$_2$, —SO$_2$NHCOR, —NH$_3$, where M is a hydrogen atom, alkali metal, ammonium or organic ammonium, and R is a $C_1$ or $C_2$ alkyl group, a substitutable phenyl group, or a substitutable naphthyl group.

6. The method for manufacturing a pigment dispersed liquid according to claim 1, wherein the hydrophilic, dispersibility-imparting group introduced to the pigment surface directly and/or via another atomic group in Step A is a sulfur-containing dispersibility-imparting group.

7. The method for manufacturing a pigment dispersed liquid according to claim 1, wherein a substance is introduced to the pigment surface directly or via another atomic group in Step A.

8. The method for manufacturing a pigment dispersed liquid according to claim 1, wherein the ultrafiltration film has a molecular cutoff that is not less than 1,000 daltons and not more than 1,000,000 daltons.

9. The method for manufacturing a pigment dispersed liquid according to claim 1, where the ultrafiltration film has a molecular cutoff size that is not less than 10,000 daltons and not more than 500,000 daltons.

10. The method for manufacturing a pigment dispersed liquid according to claim 1, wherein the aqueous medium in Step B comprises a wetting agent, and water.

11. The method for manufacturing a pigment dispersed liquid according to claim 10, wherein the wetting agent in Step B is one or more substances selected from the group consisting of acetylene glycols, acetylene alcohols, glycol ethers, and alkylene glycols.

12. The method for manufacturing a pigment dispersed liquid according to claim 11, wherein the acetylene glycol and acetylene alcohol are compounds expressed by Formula I or II.

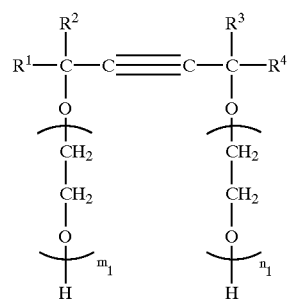

(I)

where $R^1$, $R^2$, $R^3$, and $R^4$ are each independently an alkyl group, and $m_1+n_1$ is a number from 0 to 30

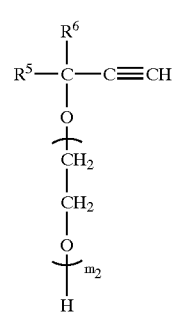

(II)

where $R^5$ and $R^6$ are each independently an alkyl group, and $m_2$ is a number from 0 to 30.

13. The pigment dispersed liquid obtained by the method of claim 1 and comprising a soluble coloring component.

14. The pigment dispersed liquid according to claim 13, wherein absorbance of the coloring component at a maximum absorption wavelength is 1.0 or less when the pigment concentration in the pigment dispersed liquid is 10 wt %.

15. An ink-jet recording ink containing the pigment dispersed liquid described in claim 13.

16. A recording product obtained by discharging the ink described in claim 15 onto a recording medium.

17. A pigment dispersed liquid prepared by ultrafiltration of an aqueous dispersion comprising pigment particles having a hydrophilic dispersibility imparting group thereon, the ultrafiltration forming the pigment dispersed liquid and a filtered liquid, wherein the electric conductivity of the filtered liquid is 10 mS/cm or less when ultrafiltration (molecular cutoff: 50,000) is conducted with a pigment concentration of 10 wt % or less.

18. The pigment dispersed liquid according to claim 17, comprising a wetting agent selected from the group consisting of acetylene glycols and acetylene alcohols.

19. A pigment dispersed liquid prepared by ultrafiltration of an aqueous dispersion comprising pigment particles having a hydrophilic dispersibility imparting groups thereon, the ultrafiltration forming the pigment dispersed liquid and a filtered liquid, wherein the electric conductivity of the filtered liquid is 1 mS/cm or less when ultrafiltration (molecular cutoff: 50,000) is conducted by adjusting a pigment concentration to 1 wt %.

20. The pigment dispersed liquid according to claim 19, comprising a wetting agent selected from the group consisting of acetylene glycols and acetylene alcohols.

21. An ink-jet recording ink comprising the pigment dispersed liquid of claim 19.

22. An ink-jet recording method, wherein energy is imparted to the ink described in claim 21 so that the ink is discharged from a recording head and adheres to a recording medium.

23. The ink-jet recording method according to claim 22, wherein the energy is mechanical energy.

24. The ink-jet recording method according to claim 22, wherein the energy is thermal energy.

25. A recording product which is recorded by the method described in claim 22.

26. A pigment dispersed liquid prepared by ultrafiltration of an aqueous dispersion comprising pigment particles having a hydrophilic dispersibility imparting group thereon dispersed in an aqueous medium, the ultrafiltration forming the pigment dispersed liquid and a filtered liquid having an absorbance at a maximum absorption wavelength of 1.0 or less when a pigment concentration in the pigment dispersed liquid is converted to 10 wt %.

* * * * *